US011758530B2

(12) United States Patent
Ly et al.

(10) Patent No.: US 11,758,530 B2
(45) Date of Patent: Sep. 12, 2023

(54) TONE RESERVATION FOR NEW RADIO SIDELINK

(71) Applicant: QUALCOMM Incorporated, San Diego, CA (US)

(72) Inventors: Hung Dinh Ly, San Diego, CA (US); Saeid Sahraei, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/482,314

(22) Filed: Sep. 22, 2021

(65) Prior Publication Data

US 2022/0095306 A1 Mar. 24, 2022

Related U.S. Application Data

(60) Provisional application No. 63/083,005, filed on Sep. 24, 2020.

(51) Int. Cl.
*H04W 72/04* (2023.01)
*H04L 27/26* (2006.01)
*H04W 72/044* (2023.01)

(52) U.S. Cl.
CPC ..... *H04W 72/0473* (2013.01); *H04L 27/2614* (2013.01)

(58) Field of Classification Search
CPC ................. H04W 72/0473; H04L 27/2614
See application file for complete search history.

(56) References Cited

U.S. PATENT DOCUMENTS

2022/0039027 A1* 2/2022 Mukkavilli ......... H04L 27/2614
2022/0159678 A1* 5/2022 Back ..................... H04W 72/20
2022/0337990 A1* 10/2022 Ebrahim Rezagah ......................
                                                           H04W 8/005

OTHER PUBLICATIONS

Han W., et al., "Hybrid PAPR Reduction Scheme for FBMC/OQAM Systems Based on Multi Data Block PTS and TR Methods", IEEE Access, vol. 4, Mar. 19, 2016 (Mar. 19, 2016), pp. 4761-4768, XP011622894, DOI:10.1109/ACCESS.2016.2605008, Sections II, III.

(Continued)

*Primary Examiner* — Derrick V Rose
(74) *Attorney, Agent, or Firm* — Loza & Loza, LLP

(57) ABSTRACT

Aspects relate to mechanisms for wireless communication devices for tone reservation. A user equipment (UE) receives an indication of one or more peak-reduction tone (PRT) resources for a transmission of one or more signals for a base station. The UE transmits a first signal to the base station on an uplink. The UE transmits a second signal to a relay entity on a sidelink for reception by the base station. The second signal is transmitted on the sidelink utilizing the one or more PRT resources.

30 Claims, 19 Drawing Sheets

(56) References Cited

OTHER PUBLICATIONS

International Search Report and Written Opinion—PCT/US2021/051726—ISA/EPO—dated Jan. 4, 2022.
Qualcomm Incorporated : "Potential Coverage Enhancement Techniques for POSCH", 3GPP Draft, 3GPP TSG-RAN WG1 Meeting #102, R1-2006977, 3rd Generation Partnership Project (3GPP), Mobile Competence Centre, 650, Route Des Lucioles, F-06921 Sophia-Antipolis Cedex, France, vol. RAN WG1, No. e-Meeting, Aug 17, 2020-Aug. 28, 2020, Aug. 14, 2020 (Aug. 14, 2020), XP051920685, 10 Pages, Retrieved from the Internet: URL : https://ftp.3gpp.org/tsg_ran/WG1_RL1/TSGR1_102-e/Docs/R1-2006977.zip. R1-2006977/ R1-2006977 Potential. coverage enhancement techniques for PUSCH . docx [retri.eved on Aug. 14, 2020) figure 1 section 2.

* cited by examiner

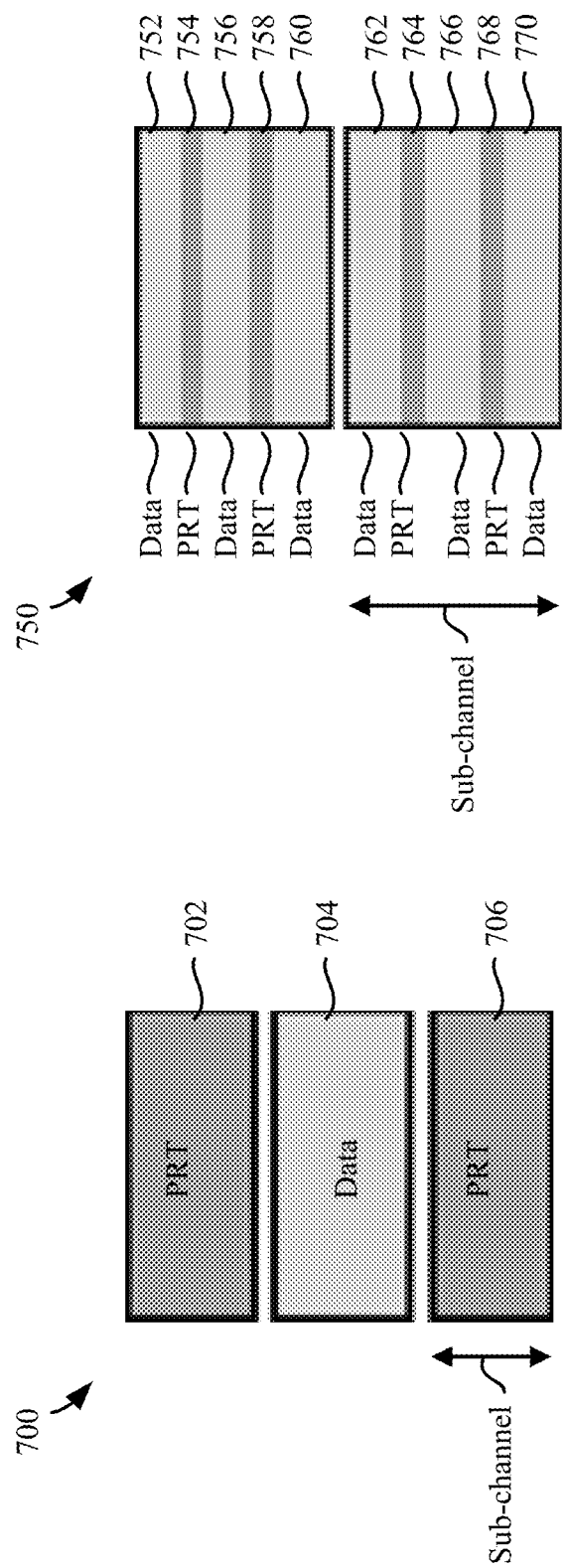

64 data tones 96 data tones

TONE RESERVATION FOR NEW RADIO SIDELINK

CROSS-REFERENCE TO RELATED APPLICATIONS

The present application for Patent claims priority to pending Provisional Application Ser. No. 63/083,005, titled "TONE RESERVATION FOR NEW RADIO," filed Sep. 24, 2020, and assigned to the assignee hereof and hereby expressly incorporated by reference herein as if fully set forth below and for all applicable purposes.

TECHNICAL FIELD

The technology discussed below relates generally to wireless communication networks, and more particularly, to tone reservation for sidelink communications.

BACKGROUND

Orthogonal frequency-division multiplexed (OFDM) signals may utilize peak-reduction tones (PRTs) to communicate data between devices. As the demand for wireless communication increases, research and development continue to advance the communication technologies field. For example, PRTs may be used for uplink communications in Fifth Generation New Radio (5G NR) communications systems. Techniques related to allocating PRT resources for the communication of signals using PRTs may further advance the 5G NR communication systems.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method for wireless communication by a scheduled entity is provided. The method includes receiving an indication of one or more peak-reduction tone (PRT) resources for a transmission of one or more signals for a base station. The method also includes transmitting a first signal to the base station on an uplink The method further includes transmitting a second signal to a relay entity on a sidelink for reception by the base station, where the second signal is transmitted on the sidelink utilizing the one or more PRT resources.

A user equipment (UE) is provided. The UE includes a transceiver for wirelessly communicating with a base station. The UE also includes a memory. The UE further includes a processor coupled to the transceiver and the memory. The processor and the memory are configured to receive an indication of one or more peak-reduction tone (PRT) resources for a transmission of one or more signals for a base station. The processor and the memory are also configured to transmit a first signal to the base station on an uplink. The processor and the memory are further configured to transmit a second signal to a relay entity on a sidelink for reception by the base station, where the second signal is transmitted on the sidelink utilizing the one or more PRT resources.

A non-transitory, processor-readable storage medium, having instructions stored thereon is provided. The instructions, when executed by a processing circuit, cause the processing circuit to receive an indication of one or more peak-reduction tone (PRT) resources for a transmission of one or more signals for a base station. The instructions, when executed by a processing circuit, also cause the processing circuit to transmit a first signal to the base station on an uplink The instructions, when executed by a processing circuit, further cause the processing circuit to transmit a second signal to a relay entity on a sidelink for reception by the base station, where the second signal is transmitted on the sidelink utilizing the one or more PRT resources.

A user equipment (UE) is provided. The UE includes a means for receiving an indication of one or more peak-reduction tone (PRT) resources for a transmission of one or more signals for a base station. The UE also includes a means for transmitting a first signal to the base station on an uplink The UE further includes a means for transmitting a second signal to a relay entity on a sidelink for reception by the base station, where the second signal is transmitted on the sidelink utilizing the one or more PRT resources.

A method for wireless communication by a scheduling entity is provided. The method includes transmitting an indication of one or more peak-reduction tone (PRT) resources for a transmission of one or more signals by a scheduled entity. The method also includes receiving a first signal from the scheduled entity and a second signal from a relay entity on an uplink, where the relay entity received the second signal from the scheduled entity on a sidelink utilizing the one or more PRT resources.

A base station is provided. The base station includes a transceiver for wirelessly communicating with a user equipment (UE). The base station also includes a memory. The base station further includes a processor coupled to the transceiver and the memory. The processor and the memory are configured to transmit an indication of one or more peak-reduction tone (PRT) resources for a transmission of one or more signals by a scheduled entity. The processor and the memory are also configured to receive a first signal from the scheduled entity and a second signal from a relay entity on an uplink, where the relay entity received the second signal from the scheduled entity on a sidelink utilizing the one or more PRT resources.

A non-transitory, processor-readable storage medium, having instructions stored thereon is provided. The instructions, when executed by a processing circuit, cause the processing circuit to transmit an indication of one or more peak-reduction tone (PRT) resources for a transmission of one or more signals by a scheduled entity. The instructions, when executed by a processing circuit, also cause the processing circuit to receive a first signal from the scheduled entity and a second signal from a relay entity on an uplink, where the relay entity received the second signal from the scheduled entity on a sidelink utilizing the one or more PRT resources.

A base station is provided. The base station includes a means for transmitting an indication of one or more peak-reduction tone (PRT) resources for a transmission of one or more signals by a scheduled entity. The base station also includes a means for receiving a first signal from the scheduled entity and a second signal from a relay entity on an uplink, where the relay entity received the second signal from the scheduled entity on a sidelink utilizing the one or more PRT resources.

A method for wireless communication by a scheduling entity is provided. The method includes receiving an indication that a relay entity is available to relay one or more signals received via a sidelink, where the one or more signals are for reception by a base station. The method also includes allocating one or more peak-reduction tone (PRT) resources for a transmission of at least one signal of the one or more signals on the sidelink The method further includes transmitting a first signal of the at least one signal to the base station on an uplink In addition, the method includes transmitting a second signal of the at least one signal to the relay entity on the sidelink for reception by the base station, where the second signal is transmitted on the sidelink utilizing the one or more PRT resources.

A user equipment (UE) is provided. The UE includes a transceiver for wirelessly communicating with a base station. The UE also includes a memory. The UE further includes a processor coupled to the transceiver and the memory. The processor and the memory are configured to receive an indication that a relay entity is available to relay one or more signals received via a sidelink, where the one or more signals are for reception by a base station. The processor and the memory are also configured to allocate one or more peak-reduction tone (PRT) resources for a transmission of at least one signal of the one or more signals on the sidelink The processor and the memory are further configured to transmit a first signal of the at least one signal to the base station on an uplink In addition, the processor and the memory are configured to transmit a second signal of the at least one signal to the relay entity on the sidelink for reception by the base station, where the second signal is transmitted on the sidelink utilizing the one or more PRT resources.

A non-transitory, processor-readable storage medium, having instructions stored thereon is provided. The instructions, when executed by a processing circuit, cause the processing circuit to receive an indication that a relay entity is available to relay one or more signals received via a sidelink, where the one or more signals are for reception by a base station. The instructions, when executed by a processing circuit, also cause the processing circuit to allocate one or more peak-reduction tone (PRT) resources for a transmission of at least one signal of the one or more signals on the sidelink The instructions, when executed by a processing circuit, further cause the processing circuit to transmit a first signal of the at least one signal to the base station on an uplink In addition, the instructions, when executed by a processing circuit, cause the processing circuit to transmit a second signal of the at least one signal to the relay entity on the sidelink for reception by the base station, where the second signal is transmitted on the sidelink utilizing the one or more PRT resources.

A user equipment (UE) is provided. The UE includes a means for receiving an indication that a relay entity is available to relay one or more signals received via a sidelink, where the one or more signals are for reception by a base station. The UE also includes a means for allocating one or more peak-reduction tone (PRT) resources for a transmission of at least one signal of the one or more signals on the sidelink The UE further includes a means for transmitting a first signal of the at least one signal to the base station on an uplink In addition, the UE includes a means for transmitting a second signal of the at least one signal to the relay entity on the sidelink for reception by the base station, where the second signal is transmitted on the sidelink utilizing the one or more PRT resources.

A method for wireless communication by a base station is provided. The method includes transmitting a message to a user equipment (UE). The method also includes receiving a first signal from the UE and a second signal from a relay entity on an uplink, where the relay entity received the second signal from the UE on a sidelink utilizing the one or more PRT resources.

A base station is provided. The base station includes a transceiver for wirelessly communicating with a user equipment (UE). The base station also includes a memory. The base station further includes a processor coupled to the transceiver and the memory. The processor and the memory are configured to transmit a message to the UE. The processor and the memory are also configured to receive a first signal from the UE and a second signal from a relay entity on an uplink, where the relay entity received the second signal from the UE on a sidelink utilizing the one or more PRT resources.

A non-transitory, processor-readable storage medium, having instructions stored thereon is provided. The instructions, when executed by a processing circuit, cause the processing circuit to transmit a message to a user equipment (UE). The instructions, when executed by a processing circuit, also cause the processing circuit to receive a first signal from the UE and a second signal from a relay entity on an uplink, where the relay entity received the second signal from the UE on a sidelink utilizing the one or more PRT resources.

A base station is provided. The base station includes a means for transmitting a message to a user equipment (UE). The base station also includes a means for receiving a first signal from the UE and a second signal from a relay entity on an uplink, where the relay entity received the second signal from the UE on a sidelink utilizing the one or more PRT resources.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 7A and 7B are diagrams illustrating examples of a frame structure for tone reservation according to some aspects.

DETAILED DESCRIPTION

Figure 1:
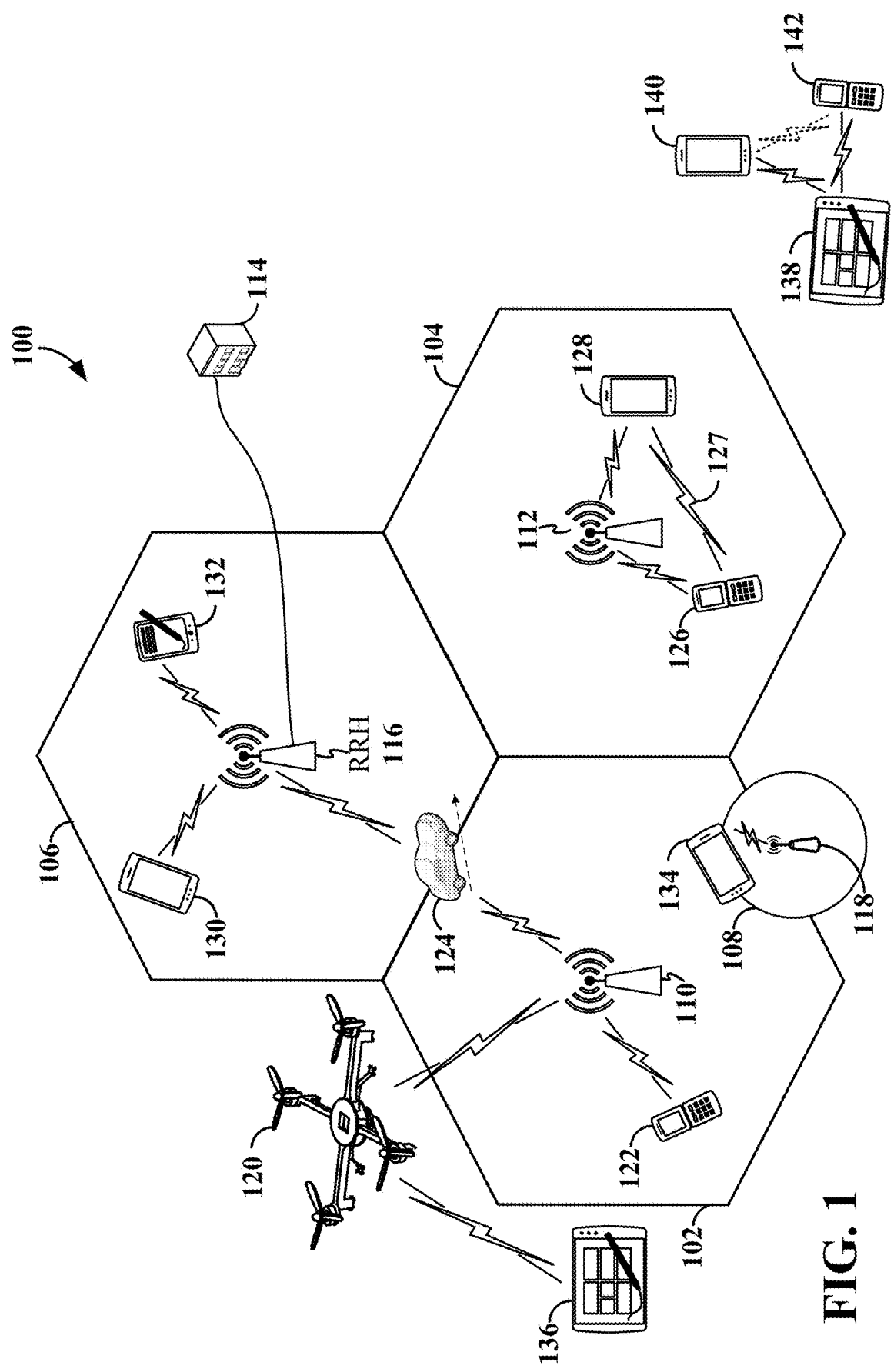
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Orthogonal frequency division multiplexing (OFDM) which has been adopted in the long-term evolution (LTE) system and the fifth-generation new radio (5G NR) can improve the system capacity. However, one main disadvantage of the OFDM is the high peak to-average power ratio (PAPR), which can be reduced by using tone reservation (TR). In tone reservation based OFDM systems; the PAPR reduction performance mainly depends on the selection of the peak reduction tone (PRT) set. PRTS include a small subset of subcarriers and may be used to generate a peak-canceling signal for PAPR reduction.

Various aspects of the disclosure relate to tone reservation. For example, a base station may generate and transmit to a user equipment (UE) an indication of one or more peak reduction tone (PRT) resources for a transmission of one or more signals for the base station. The UE may receive the indication and a relay availability message indicating that a relay entity is available to receive one or more signals via a sidelink from the UE using the one or more PRT resources. The UE generates a first signal for transmission to the base station and transmits the first signal to the base station on an uplink The UE also generates a second signal for reception by the base station. The UE transmits the second signal to the relay entity on the sidelink utilizing the one or more PRT resources. The relay entity receives the second signal and relays or transmits the second signal to the base station on the uplink The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a transmitting sidelink device, and UEs 140 and 142 may function as a scheduled entity or a receiving sidelink device. For example, UE 138 may function as a scheduling entity in a device-to-device (D2D), peer-to-peer (P2P), vehicle-to-everything (V2X), and/or in a mesh network. In a mesh network example, UEs 140 and 142 may optionally communicate directly with one another in addition to communicating with the scheduling entity 138.

In some aspects of the present disclosure, two or more UEs (e.g., UEs 126 and 128) within the coverage area of a serving base station 112 may communicate with each other using sidelink signals 127 without relaying that communication through the base station. In this example, the base station 127 or one or both of the UEs 126 and 128 may function as scheduling entities to schedule sidelink communication between UEs 126 and 128. For example, UEs 126 and 128 may communicate sidelink signals 127 within a vehicle-to-everything (V2X) network.

Two primary technologies that may be used by V2X networks include dedicated short-range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
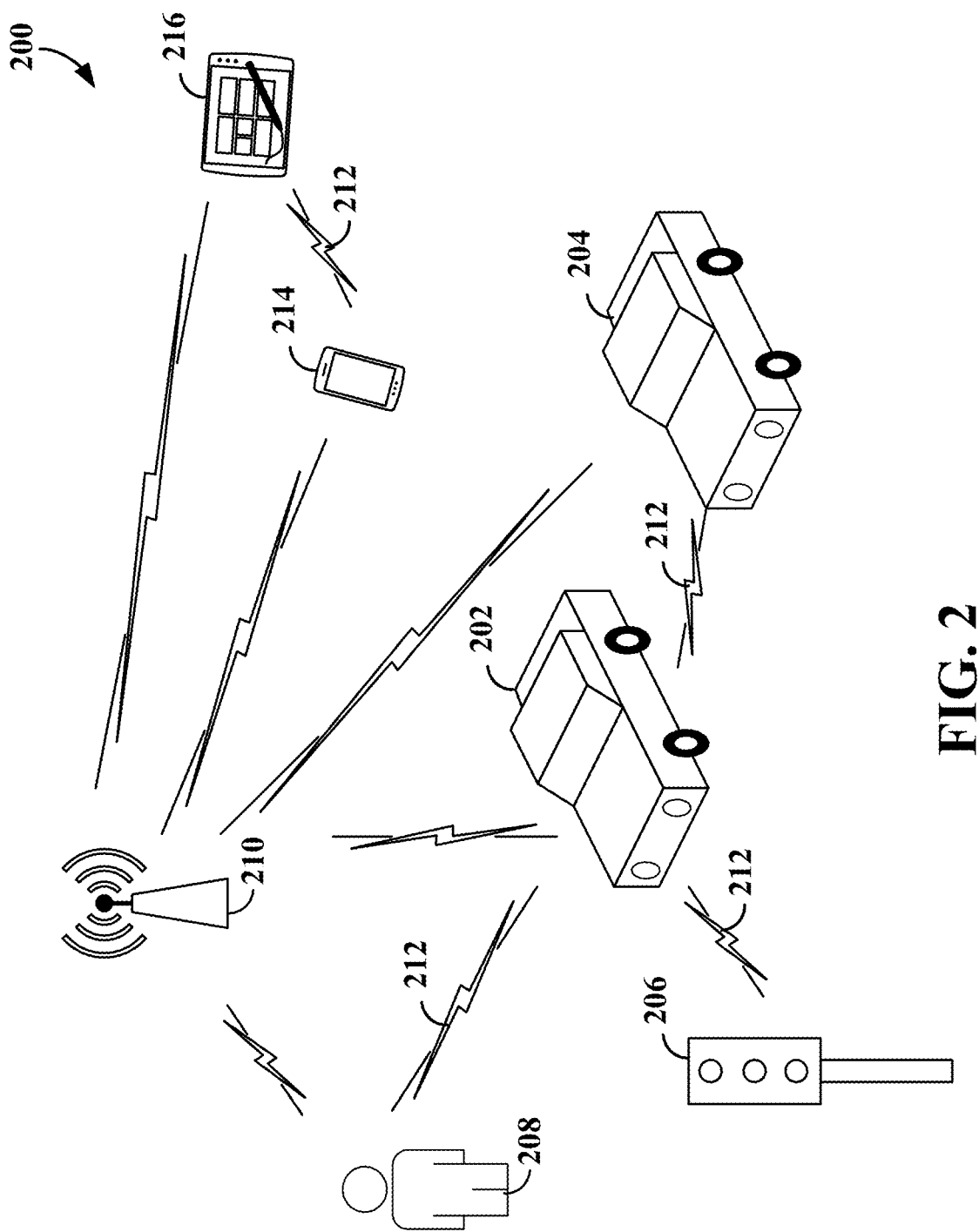
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure 206, such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 15, or other suitable standard.

V2X communication enable vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicles 202 and 204 or between a vehicle 202 or 204 and either infrastructure 206 or a pedestrian 208 occurs over a proximity service (ProSe) PC5 interface 212. In various aspects of the disclosure, the PC5 interface 212 may further be utilized to support D2D communication in other proximity use cases. Examples of other proximity use cases may include public safety or commercial (e.g., entertainment, education, office, medical, and/or interactive) based proximity services. As used herein, the term proximity service (ProSe) communication refers to the direct (e.g., D2D) communication between UEs in proximity use cases other than V2X. In the example shown in FIG. 2, ProSe communication may occur between UEs 214 and 216.

ProSe communication may support different operational scenarios, such as in-coverage, out-of-coverage, and partial coverage. Out-of-coverage refers to a scenario in which UEs 214 and 216 are outside of the coverage area of a base station (e.g., base station 210), but each are still configured for ProSe communication. Partial coverage refers to a scenario in which one of the UEs (e.g., UE 216) is outside of the coverage area of a base station (e.g., base station 210), while the other UE (e.g., UE 214) is in communication with the base station 210. In-coverage refers to a scenario in which UEs 214 and 216 are in communication with the base station 210 (e.g., gNB) via a Uu (e.g., cellular interface) connection to receive ProSe service authorization and provisioning information to support ProSe operations.

Figure 3:
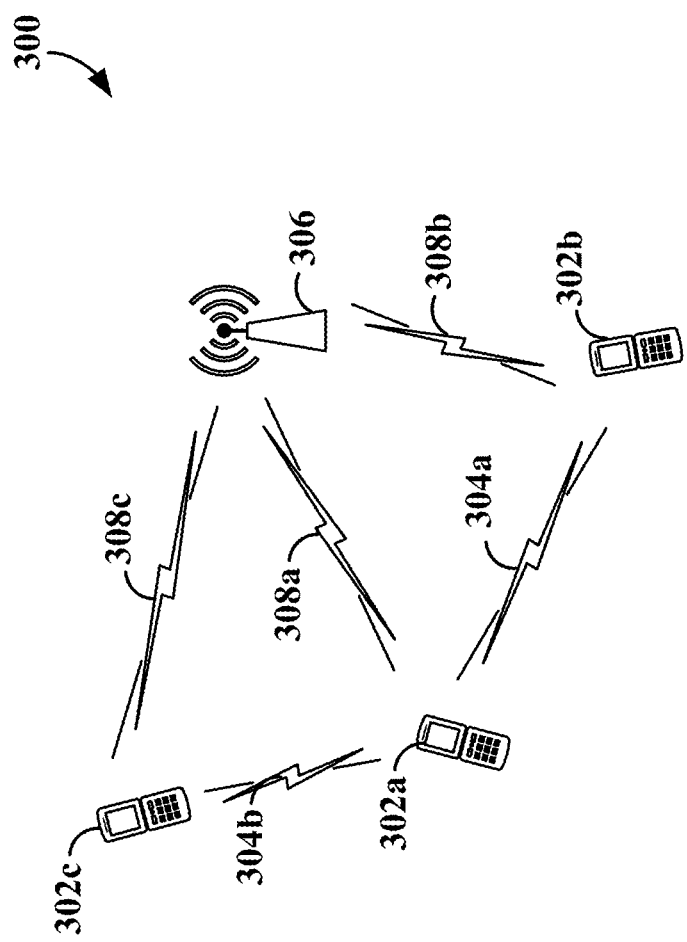
FIG. 3 is a diagram illustrating an example of a wireless communication system for facilitating both cellular and sidelink communication according to some aspects.

FIG. 3 is a diagram illustrating an example of a wireless communication system 300 for facilitating both cellular and sidelink communication. The wireless communication system 300 includes a plurality of wireless communication devices 302a, 302b, and 302c and a base station (e.g., eNB or gNB) 306. In some examples, the wireless communication devices 302a, 302b, and 302c may be UEs capable of implementing D2D or V2X devices within a V2X network.

The wireless communication devices 302a and 302b may communicate over a first PC5 interface 304a, while wireless communication devices 302a and 302c may communicate over a second PC5 interface 304b. Wireless communication devices 302a, 302b, and 302c may further communicate with the base station 306 over respective Uu interfaces 308a, 308b, and 308b. The sidelink communication over the PC5 interfaces 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 304a and 304b and Uu interfaces 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication system 300 may be configured to support a V2X network in which resources for both sidelink and cellular communication are scheduled by the base station 306. In other examples, the wireless communication devices 302a-302c may autonomously select sidelink resources (e.g., from one or more frequency bands or sub-bands designated for sidelink communication) for communication therebetween.

In this example, the wireless communication devices 302a-302c may function as both scheduling entities and scheduled entities scheduling sidelink resources for communication with each other.

Figure 4:
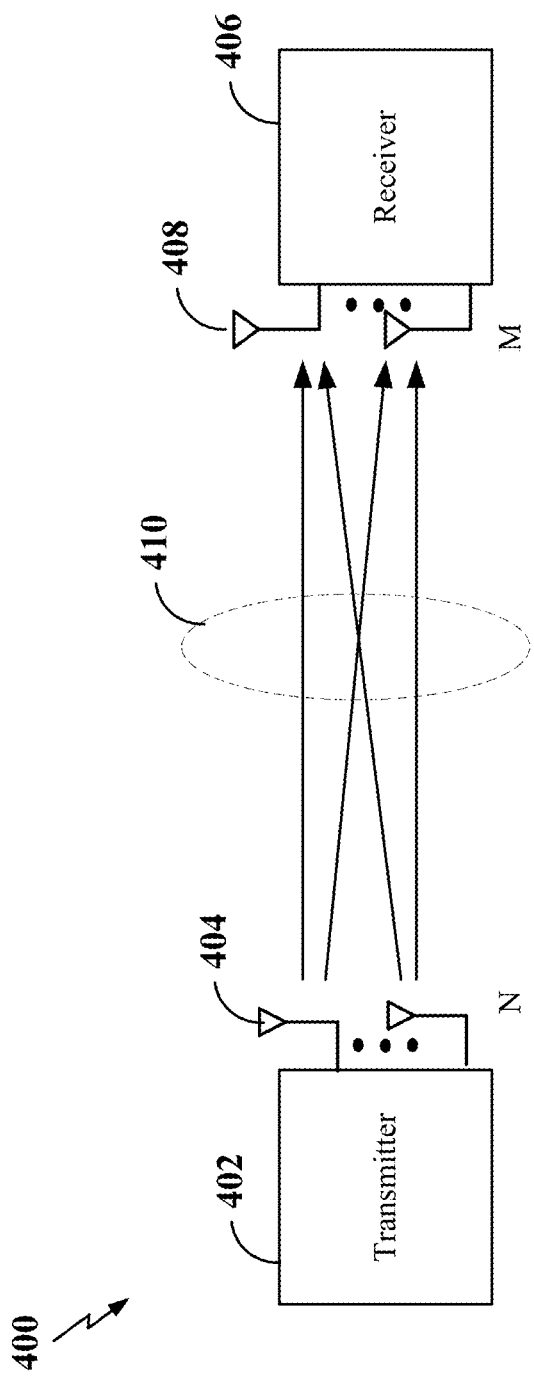
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems. In addition, beamformed signals may further be utilized in D2D systems, such as NR SL or V2X, utilizing FR2.

Various aspects of the present disclosure will be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
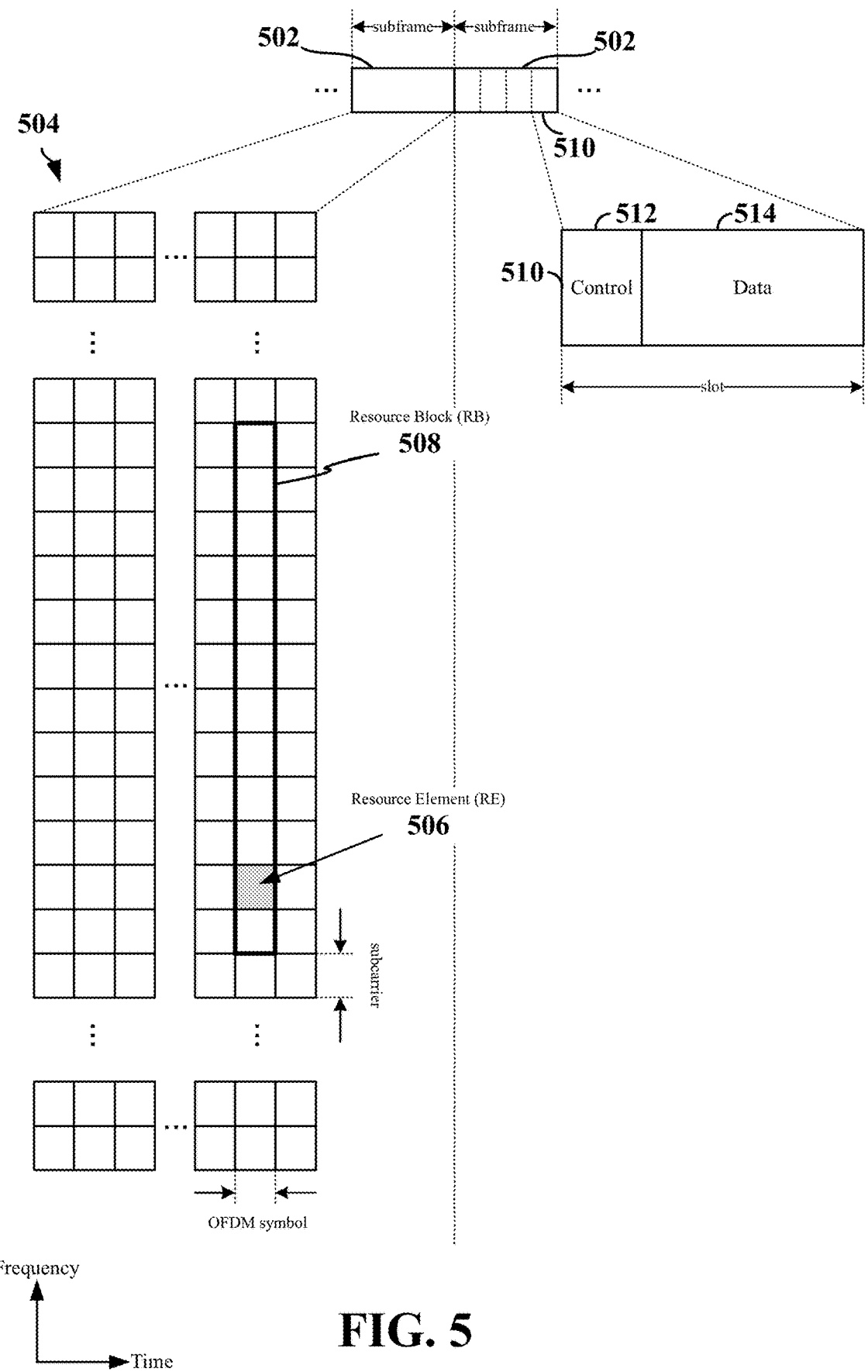
FIG. 5 is a diagram illustrating an example of a frame structure for use in a wireless communication network according to some aspects.

Referring now to FIG. 5, an expanded view of an exemplary subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier ×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 508 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random-access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 5 are not necessarily all of the channels or carriers that may be utilized between devices, and those of ordinary skill in the art will recognize that other channels or carriers may be utilized in addition to those illustrated, such as other traffic, control, and feedback channels.

Tone reservation is a distortion-less peak to average power (PAPR) reduction technique that aims to modify the time-domain characteristic of a signal by optimizing a value of designated PRTs. Generally, no overlap may exist between PRTs and data tones. A receiver may not need to decode the PRTs, but only know the location of the PRTs. An optimal amplitude and a phase of the PRT may be highly data dependent, but the indices may not be.

In some examples, a remote UE may be out of coverage such that the UE is not able to communicate directly with a base station on the uplink The UE may communicate with the base station via a relay entity (e.g., another UE) over a PC5 connection. In other examples, a remote UE may be in coverage and setup with dual uplink connectivity with a base station and a relay UE. The remote UE communicates with the base station over the uplink and with the relay entity over a PC5 connection. To support sidelink (PC5) communication, PRT resources may allocated by a base station. In this case, the base station may allocate one or more PRT resources for sidelink communications between UEs. In some aspects, the UEs may autonomously select or allocate PRT resources for sidelink communications between UEs. In some aspects, signaling on the sidelink may be the same between two nodes such that from the perspective of the receiver, there is no difference between two nodes. In some examples, new radio (NR) sidelink communication supports hybrid automated repeat request (HARQ)-based transmissions.

Figure 6:
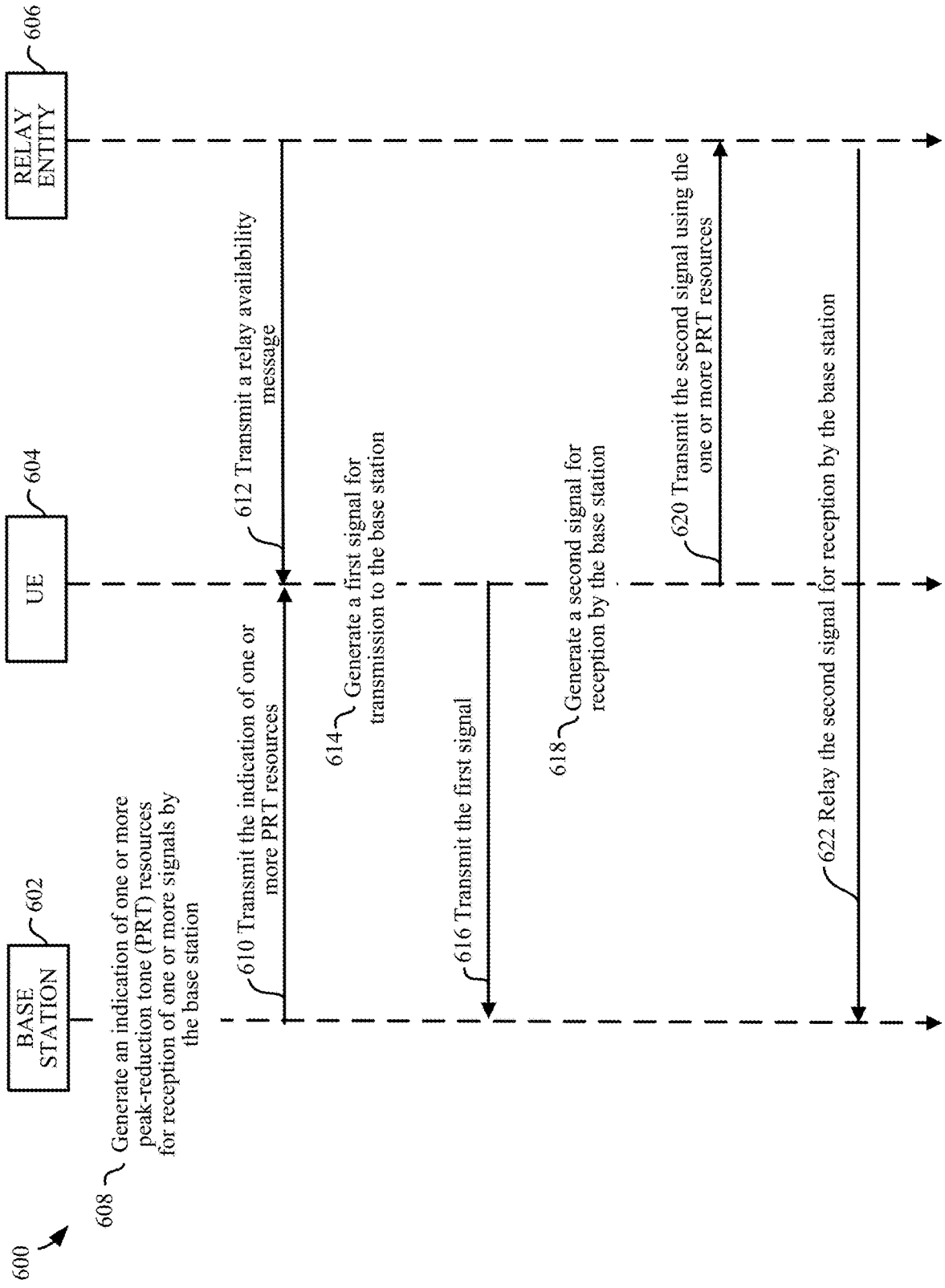
FIG. 6 is a conceptual diagram illustrating an example of tone reservation according to some aspects.

Various aspects of the disclosure relate to tone reservation. For example, a base station may generate and transmit to a user equipment (UE) an indication of one or more peak reduction tone (PRT) resources for a transmission of one or more signals for the base station. The UE may receive the indication and a relay availability message indicating that a relay entity is available to receive one or more signals via a sidelink from the UE using the one or more PRT resources. The UE generates a first signal for transmission to the base station and transmits the first signal to the base station on an uplink The UE also generates a second signal for reception by the base station. The UE transmits the second signal to the relay entity on the sidelink utilizing the one or more PRT resources. The relay entity receives the second signal and relays or transmits the second signal to the base station on the uplink FIG. 6 is a signaling diagram illustrating an example of tone reservation according to some aspects. In the example shown in FIG. 6, a base station 602 (e.g., a RAN node) is in wireless communication with a user equipment (UE) 604 (e.g., a wireless communication device) and a relay entity 606 (e.g., another wireless communication device) over an access link Each of the base station 602, the UE 604, and the relay entity 606 may correspond to any of the entities, gNodeBs, UEs, V2X device, or D2D devices shown in FIGS. 1-4.

At 608, the base station 602, which may be a transmitting wireless communication device, generates an indication of one or more peak-reduction tone (PRT) resources for reception of one or more signals by the base station. As described herein, the one or more PRT resources may be used for sidelink communication between the UE 604 and the relay entity 606. Additionally, or alternatively, the one or more PRT resources may be used for sidelink communication between the relay entity 606 and one or more other relay entities. Additionally, or alternatively, the one or more PRT resources may be used for uplink communication between the UE 604 and the base station 602. Additionally, or alternatively, the one or more PRT resources may be used for uplink communication between one or more relay entities and the base station 602. In some examples, the one or more PRT resources may be used for sidelink communication between the base station 602 and the UE 604 when direct communication (uplink or downlink) is unavailable, intermittent, or below a threshold strength or quality.

In some aspects, as discussed further herein with respect to FIGS. 7A and 7B, the one or more PRT resources may include one or more sub-channels. In some aspects, the one or more PRT resources may include an arbitrary set of one or more allocated resources. For example, the one or more allocated resources may include one or more integer multiples of one or more sub-channels. In some aspects, each of one or more PRT resources may include an optimized PRT value. In some aspects, the value of each PRT resource of the one or more PRT resources may be optimized according to the waveform. In some aspects, a location of each PRT resource of the one or more PRT resources may be allocated according to a fixed pseudo-random pattern. For example, a location of each PRT resource of the one or more PRT resources may be allocated according to a fixed pseudo-random pattern that is determined based on Golomb rulers. In certain examples, the patterns may be known to both the base station 602 and the UE 604. As discussed further herein with respect to FIGS. 8A and 8B, each of the one or more PRT resources may utilize side-band PRT resource allocation or in-band PRT resource allocation.

At 610, the base station 602 transmits the indication of the one or more PRT resources to the UE 604. In some aspects, the base station 602 may transmit the indication of the one or more PRT resources to the UE 604 using a physical downlink control channel (PDCCH) (e.g., downlink control information (DCI) of a PDCCH). For example, the base station 602 may have an established link with the UE 604 such that the base station 602 and the UE 604 are transmitting data packets between each other. During such communication, the base station 602 may transmit the one or more PRT resources to the UE using a PDCCH. In some aspects, the base station 602 may transmit the indication of the one or more PRT resources using a medium access control (MAC) control element (MAC-CE), a radio access network (RAN) MAC-CE, a RAN radio resource control (RRC) message, or the like.

At 612, the UE 604 receives a relay availability message from the relay entity 606. The relay availability message informs the UE 604 that the relay entity 606 is available to receive a signal from the UE 604 and transmit the signal for reception by the base station 602. The UE 604 may receive a relay availability message from the relay entity 606 before, while, or after the UE 604 receives the indication of the one or more PRT resources from the base station 602. As discussed further herein with respect to FIG. 9, the relay availability message may be a solicitation message received from the relay entity 606. In response to the UE 604 receiving the solicitation message from the relay entity 606, the UE 604 may transmit a response (e.g., an acknowledgement response) in forming the relay entity 606 that the UE 604 is aware that the relay entity 606 is available for signal relay. As described further herein with respect to FIG. 10, the relay availability message may be an announcement message received from the relay entity 606. In response to the UE 604 receiving the announcement message from the relay entity 606, the UE 604 may simply transmit one or more signals to the relay entity 606 without any additional acknowledgement.

At 614, the UE 604 may generate a first signal for transmission to the base station 602. The first signal may be, for example, a discovery signal or a data signal. At 616, the UE 604 may transmit the first signal to the base station 602. For example, the UE 602 may transmit the first signal to the base station 602 on an uplink In some examples, the UE 602 may transmit the first to the base station 602 on the uplink utilizing the one or more PRT resources provided in the indication.

At 618, the UE 604 may generate a second signal for reception by the base station 602. The first signal may be, for example, a discovery signal or a data signal (e.g., a data communication signal). In some aspects, the second signal may be the same signal as first signal. For example, the first signal may be a discovery signal and the second signal may be a same discovery signal as the first signal. As another example, the first signal may be a data signal and the second signal by another data signal (e.g., same type of signal, but a different signal). When the first signal and the second signal are the same signal (e.g., the same exact signal), the UE 604 may transmit the first signal to the base station 602 and the second signal to the relay entity 606 for reception by the base station 602 so that the intended message contained in the first signal and the second may have a greater chance of being received by the base station 602.

In some aspects, the second signal is a different signal than the first signal. For example, the first signal may be a first discovery signal and the second signal may be a second and different discovery signal compared to the first signal. As another example, the first signal may be a discovery signal and the second signal may be data signal. When the first signal and the second signal are different signals, the UE 604 may transmit the first signal to the base station 602 and the second signal to the relay entity 606 for reception by the base station 602.

At 620, the UE 604 may transmit the second signal using the one or more PRT resources. For example, the UE 604 may transmit the second signal to the relay entity 606 using the one or more PRT resources on a sidelink In some aspects, upon receiving the second signal, the relay entity 606 may relay or transmit the second signal to the base station 602 on the uplink. As another example, the UE 604 may transmit the second signal to a plurality of relay entities using the one or more PRT resources on a sidelink. In some aspects, upon receiving the second signal, each of the relay entities may relay or transmit the second signal to the base station 602 on the uplink. As yet another example, the UE 604 may transmit the second signal to the relay entity 606 using the one or more PRT resources on the sidelink so that the relay entity 606 transmits the second signal to another relay entity on the sidelink In some aspects, upon receiving the second signal on the sidelink, the other relay entity may relay or transmit the second signal to the base station 602 on the uplink At 622, the relay entity 606 may transmit the second signal to the base station 602. For example, upon receiving the second signal from the UE 604 using the one or more PRT resources, the relay entity 606 may transmit the second signal to the base station 602. As another example, upon receiving the second signal from the UE 604 using the one or more PRT resources, each of a plurality of relay entities may transmit the second signal to the base station 602. As yet another example, upon receiving the second signal from the UE 604 using the one or more PRT resources, the relay entity 606 may transmit the second signal to another relay entity which transmits the second signal to the base station 602.

In some aspects, after the UE 604 transmits the second signal to the relay entity 606 using the one or more PRT resources on the sidelink, the UE 604 may receive another indication of one or more PRT resources for a transmission of one or more additional signals for the base station 602. In this example, the UE 604 may generate and transmit one or more additional signals on an uplink to the base station 602 and/or on a sidelink to one or more relay entities. The UE 604 may transmit the one or more additional signals utilizing the one or more PRT resources indicated in the other indication. In some examples, each of the one or more additional signals may be a discovery signal or a data signal.

FIGS. 7A and 7B are diagrams illustrating examples of a frame structure for tone reservation according to some aspects. As shown in FIG. 7A, the frame structure 700 includes a plurality of sub-channels. A first sub-channel 702 and a third sub-channel 706 include PRT resources. A second sub-channel 704 includes data. As shown in FIG. 7B, the frame structure 750 includes a plurality of sub-channels. Each of the sub-channels includes both PRT resources and data. For example, a first sub-channel includes a first set of data 752, a first PRT resource 754, a second set of data 756, a second PRT resource 758, and a third set of data 760. Anther sub-channel includes a fourth set of data 762, a third PRT resource 764, a fifth set of data 766, a fourth PRT resource 768, and a sixth set of data 770. In some aspects, only the allocated resources transmitted by a UE are integer multiples of a sub-channel. In some aspects, the PRT resources may be an arbitrary subset of the allocated resources.

Figure 8A:
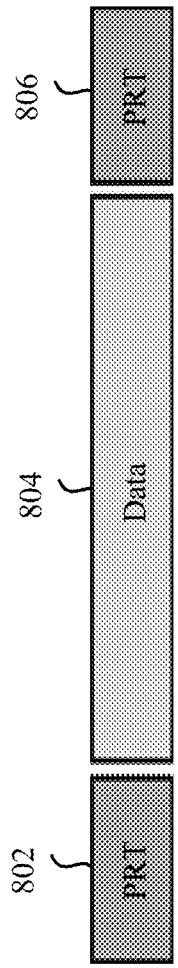
FIGS. 8A and 8B are diagrams illustrating examples of a frame structure for tone reservation according to some aspects.
Figure 8B:
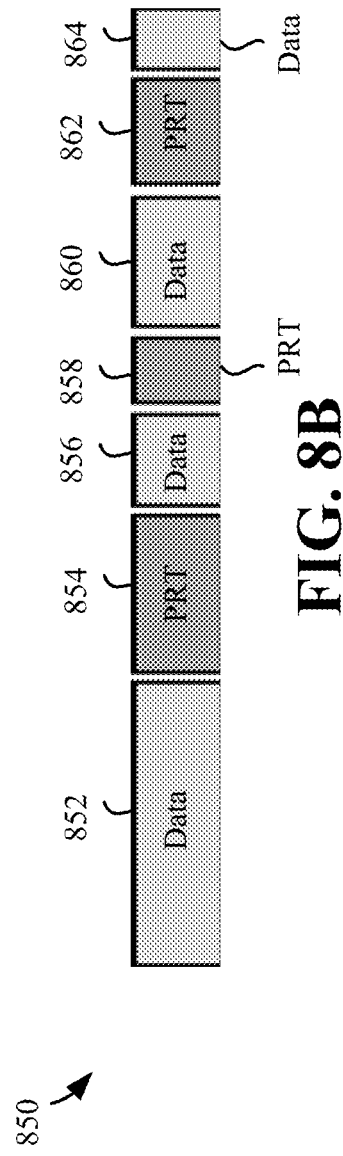

FIGS. 8A and 8B are diagrams illustrating examples of a frame structure for tone reservation according to some aspects. As shown in FIG. 8A, the frame structure 800 includes locations for PRT resources and data. In the frame structure 800, the PRT resource locations 802 and 806 are allocated in side-bands on either side of the data location 804. As shown in FIG. 8B, the frame structure 850 also includes locations for PRT resources and data. In the frame structure 850, the PRT resource locations 854, 858, and 862 are allocated in-band amongst the data locations 852, 856, 860, and 864. Tone reservation is a distortion-less peak to average power (PAPR) reduction technique that aims to modify the time-domain characteristic of a signal by optimizing a value of designated PRTs. Generally, no overlap may exist between PRTs and data tones. A receiver may not need to decode the PRTs, but only know the location of the PRTs. An optimal amplitude and a phase of the PRT may be highly data dependent, but the indices may not be. In some aspects, the locations of the PRTs may be fixed according to pseudo-random patterns such as Golomb rulers. The patterns may be known to the base station and the UE.

Figure 9:
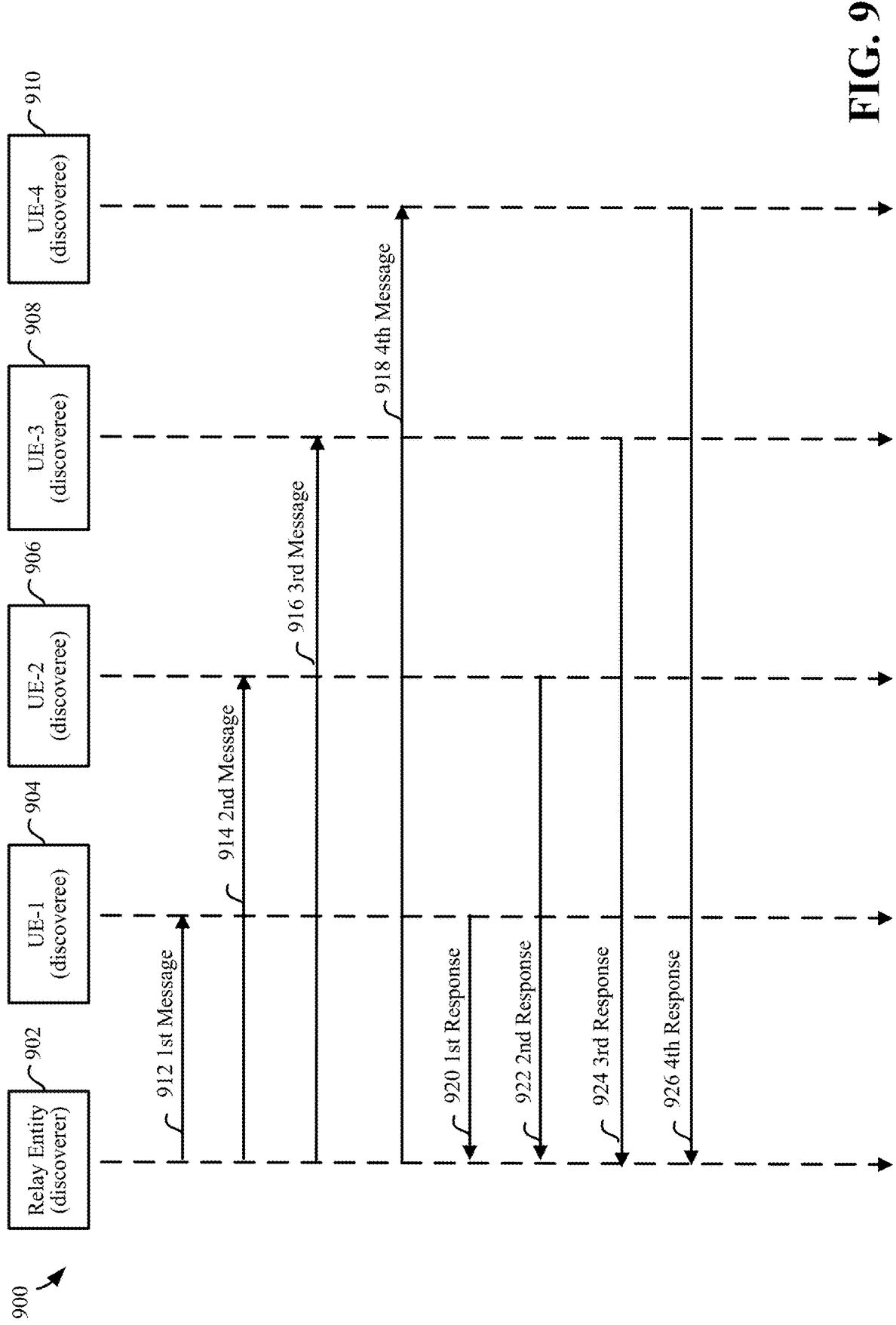
FIG. 9 is another conceptual diagram illustrating an example of relay entity communication for tone reservation according to some aspects.

FIG. 9 is a conceptual diagram illustrating an example of relay entity communication for tone reservation according to some aspects. Generally, with new radio (NR) sidelink communication, a relay (e.g., a UE as a relay, an announcer or discoverer) may transmit a discovery signal via a physical sidelink shared channel (PSSCH) to announce that the UE may operate as a relay. In addition, the UE may transmit PC5 communication (e.g., sidelink communication) via PSSCH to another relay or a remote relay. It should be understood that PSSCH for discovery and PSSCH for communication may have the same structure such that a network may only be able to determine whether PSSCH is for communication or discovery in an upper network layer.

As shown in FIG. 9, a relay entity 902 (e.g., a discoverer) may transmit a first message 912 to a first UE 904. The relay entity 902 may also transmit a second message 914 to a second UE 906. Further, the relay entity 902 may transmit a third message 916 to a third UE 908. In addition, the relay entity 902 may transmit a fourth message 918 to a fourth UE 910. Each of the first message 912, the second message 914, the third message 916, and the fourth message 918 may include a solicitation by the relay entity 902 to each of the respective UEs for asking whether the UEs wish to use the relay entity as a relay for receiving one or more signals via sidelink communication (e.g., PC5) utilizing one or more PRT resources for transmission to a base station. In some aspects, each of the first message 912, the second message 914, the third message 916, and the fourth message 918 may be a solicitation message or a relay availability message as described herein. The relay entity 902 may be a discoverer and each of the first UE 904, the second UE 906, the third UE 908, and the fourth UE 910 may be a discoveree.

In response to receiving the first message 912, the first UE 904 may transmit a first response message 920 to the relay entity 902 acknowledging whether the first UE 904 may wish to transmit one or more signals to the relay entity 902 on the sidelink utilizing the one or more PRT resources and for transmission to a base station. Similarly, in response to receiving the second message 914, the second UE 906 may transmit a second response message 922 to the relay entity 902 acknowledging whether the second UE 906 may wish to transmit one or more signals to the relay entity 902 on the sidelink utilizing the one or more PRT resources and for transmission to a base station. Further, in response to receiving the third message 916, the third UE 908 may transmit a third response message 924 to the relay entity 902 acknowledging whether the third UE 908 may wish to transmit one or more signals to the relay entity 902 on the sidelink utilizing the one or more PRT resources and for transmission to a base station. In addition, in response to receiving the fourth message 918, the fourth UE 910 may transmit a fourth response message 926 to the relay entity 902 acknowledging whether the fourth UE 910 may wish to transmit one or more signals to the relay entity 902 on the sidelink utilizing the one or more PRT resources and for transmission to a base station. Each of the relay entity 902, first UE 904, the second UE 906, the third UE 908, and the fourth UE 910 may correspond to any of the entities, gNodeBs, UEs, V2X device, or D2D devices shown in FIGS. 1-4, and 6.

Figure 10:
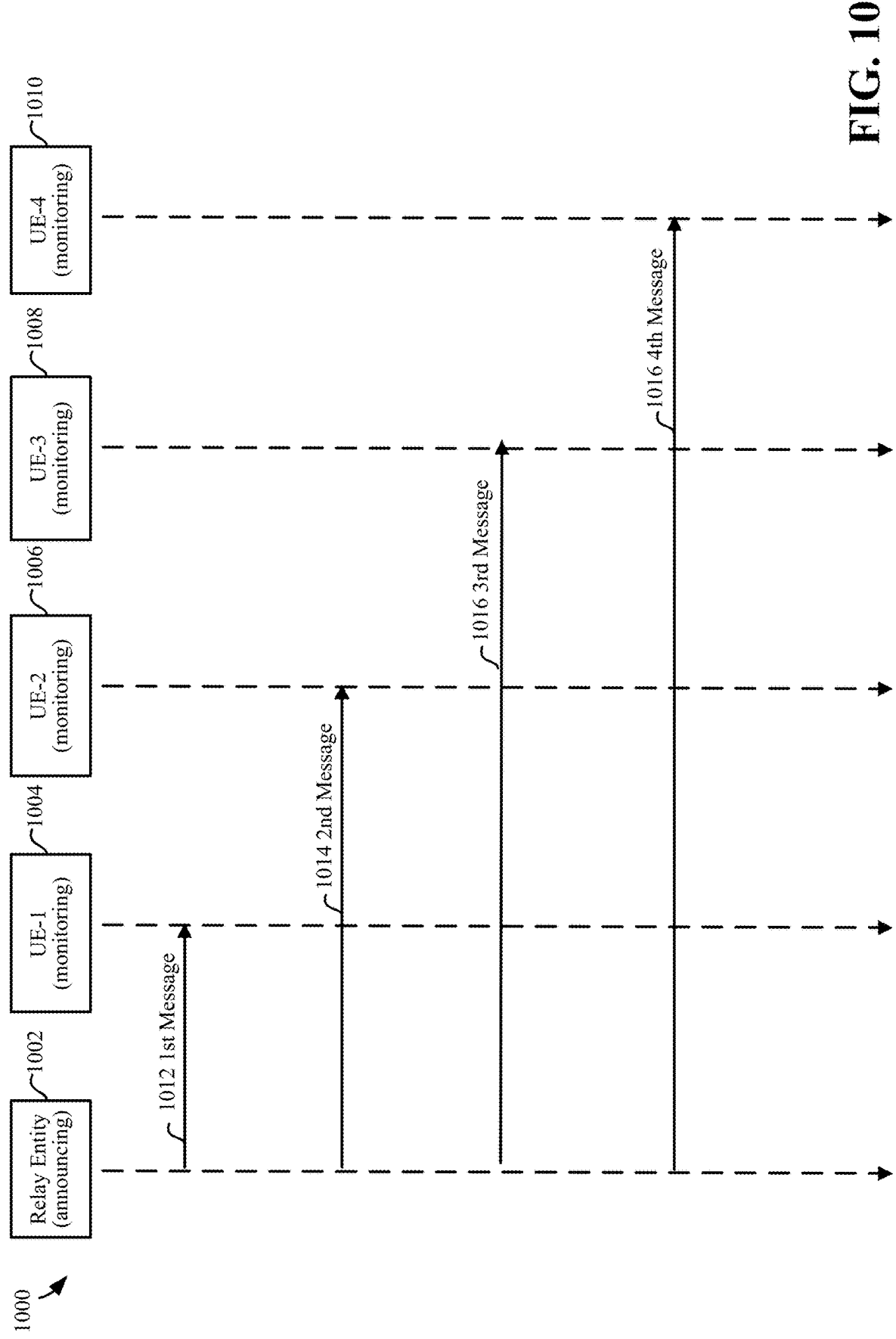
FIG. 10 is a conceptual diagram illustrating an example of relay entity communication for tone reservation according to some aspects.

FIG. 10 is another conceptual diagram illustrating an example of relay entity communication for tone reservation according to some aspects. As shown in FIG. 10, a relay entity 1002 may transmit a first message 1012 to a first UE 1004. The relay entity 1002 may also transmit a second message 1014 to a second UE 1006. Further, the relay entity 1002 may transmit a third message 1016 to a third UE 1008. In addition, the relay entity 1002 may transmit a fourth message 1018 to a fourth UE 1010. Each of the first message 1012, the second message 1014, the third message 1016, and the fourth message 1018 may include an announcement by the relay entity 1002 to each of the respective UEs for informing the UEs that the relay entity is available for receiving one or more signals via sidelink communication (e.g., PC5) utilizing one or more PRT resources and for transmitting or relay the one or more signal for reception by a base station. In some aspects, each of the first message 1012, the second message 1014, the third message 1016, and the fourth message 1018 may be an announcement message or a relay availability message as described herein. The relay entity 1002 may be an announcing entity and each of the first UE 1004, the second UE 1006, the third UE 1008, and the fourth UE 1010 may be a monitoring entity. Each of the relay entity 1002, first UE 1004, the second UE 1006, the third UE 1008, and the fourth UE 1010 may correspond to any of the entities, gNodeBs, UEs, V2X device, or D2D devices shown in FIGS. 1-4,6, and 9.

Figure 11:
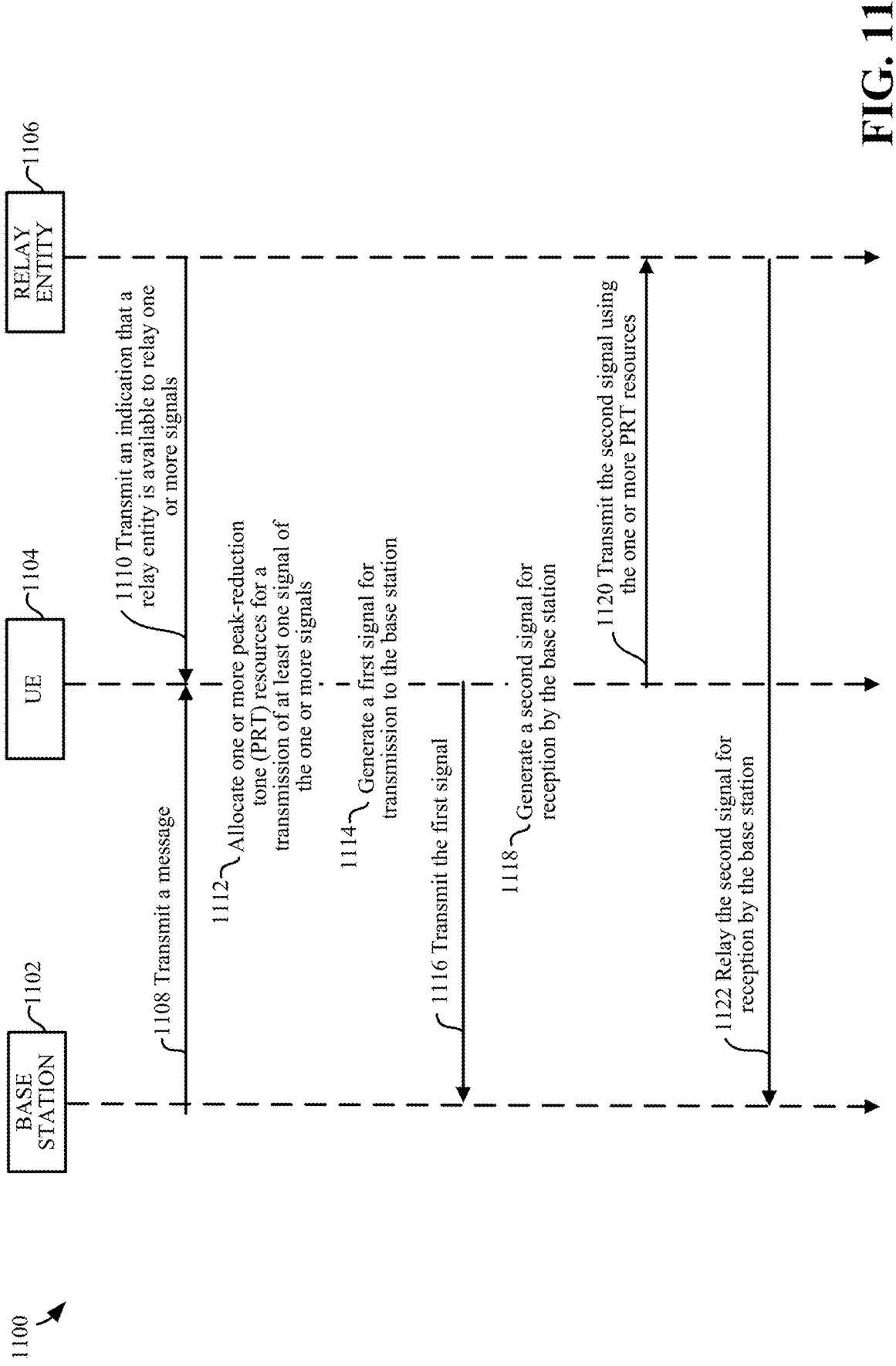
FIG. 11 is another conceptual diagram illustrating an example of tone reservation according to some aspects.

FIG. 11 is another signaling diagram illustrating an example of tone reservation according to some aspects. In the example shown in FIG. 11, a base station 1102 (e.g., a RAN node) is in wireless communication with a user equipment (UE) 1104 (e.g., a wireless communication device) and a relay entity 1106 (e.g., another wireless communication device) over an access link Each of the base station 1102, the UE 1104, and the relay entity 1106 may correspond to any of the entities, gNodeBs, UEs, V2X device, or D2D devices shown in FIGS. 1-4, 6, 9, and 10.

At 1108, the base station 1102, which may be a transmitting wireless communication device, transmits a message to the UE 1104. For example, the message may be a discovery message or a data message (e.g., a data communication message). At 1110, the UE 1104 may receive an indication that the relay entity 1106 is available to relay one or more signals. Step 1110 may be the same as or may be at least similar to step 612 illustrated in FIG. 6. In some aspects, the UE 1104 may receive the indication that the relay entity 1106 is available to relay one or more signal before, while, or after the UE 1104 receives the message at 1108.

At 1112, the UE 1104 may allocate one or more peak-reduction tones (PRTs) resources for a transmission of one or more signal for reception by the base station 1102. As described herein, the one or more PRT resources may be used for sidelink communication between the UE 1104 and the relay entity 1106. Additionally, or alternatively, the one or more PRT resources may be used for sidelink communication between the relay entity 1106 and one or more other relay entities. Additionally, or alternatively, the one or more PRT resources may be used for uplink communication between the base station 1102 and the UE 1104. Additionally, or alternatively, the one or more PRT resources may be used for uplink communication between the base station 1102 and one or more relay entities. In some examples, the one or more PRT resources may be used for sidelink communication between the base station 1102 and the UE 1104 when direct communication (uplink or downlink) is unavailable, intermittent, or below a threshold strength or quality.

In some aspects, as discussed herein with respect to FIGS. 7A and 7B, the one or more PRT resources may include one or more sub-channels. In some aspects, the one or more PRT resources may include an arbitrary set of one or more allocated resources. For example, the one or more allocated resources may include one or more integer multiples of one or more sub-channels. In some aspects, each of one or more PRT resources may include an optimized PRT value. In some aspects, each of the one or more PRT resources may be allocated according to a fixed pseudo-random pattern. For example, each of the one or more PRT resources may be allocated according to a fixed pseudo-random pattern that is determined based on Golomb rulers. In certain examples, the patterns may be known to both the base station 1102 and the UE 1104. As discussed herein with respect to FIGS. 8A and 8B, each of the one or more PRT resources may utilize side-band PRT resource allocation or in-band PRT resource allocation.

At 1114, the UE 1104 may generate a first signal for transmission to the base station 602. Step 1114 may be the same as or at least similar to step 614 illustrated in FIG. 6. The first signal may be, for example, a discovery signal or a data signal. At 1116, the UE 604 may transmit the first signal to the base station 1102. Step 1116 may be the same as or at least similar to step 616 illustrated in FIG. 6. At 1118, the UE 1104 may generate a second signal for reception by the base station 1102. Step 1116 may be the same as or at least similar to step 616 illustrated in FIG. 6. At 1120, the UE 1104 may transmit the second signal using the one or more PRT resources. Step 1120 may be the same as or at least similar to step 620 illustrated in FIG. 6. At 1122, the relay entity 1106 may transmit the second signal to the base station 1102. Step 1122 may be the same as or at least similar to step 622 illustrated in FIG. 6.

In some aspects, after the UE 1104 transmits the second signal to the relay entity 1106 using the one or more PRT resources on the sidelink, the UE 1104 may receive another indication of one or more PRT resources for a transmission of one or more additional signals for the base station 1102. In this example, the UE 1104 may generate and transmit one or more additional signals on an uplink to the base station 1102 and/or on a sidelink to one or more relay entities. The UE 1104 may transmit the one or more additional signals utilizing the one or more PRT resources indicated in the other indication. In some examples, each of the one or more additional signals may be a discovery signal or a data signal.

Figure 12:
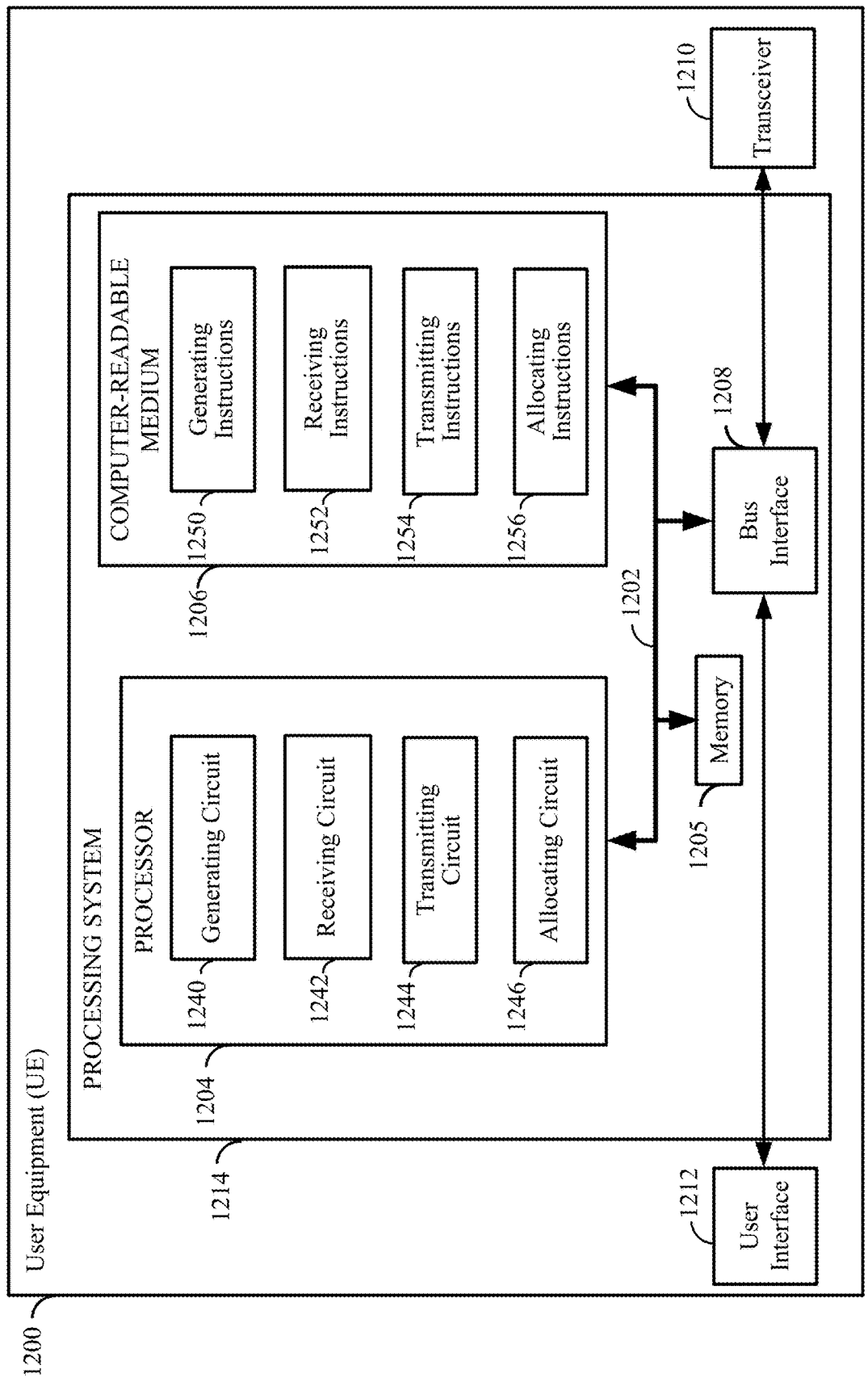
FIG. 12 is a block diagram illustrating an example of a hardware implementation for a user equipment (UE) employing a processing system according to some aspects.

FIG. 12 is a block diagram illustrating an example of a hardware implementation for a wireless communication device or a user equipment (UE) 1200 employing a processing system 1214. For example, the UE 1200 may be any of the UEs illustrated in any one or more of FIGS. 1-4, 9, 10, and 11.

The UE 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes described herein. The processor 1204 may in some instances be implemented via a baseband or modem chip and in other implementations, the processor 1204 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), and computer-readable media (represented generally by the computer-readable storage medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a means for communicating with various other apparatus over a transmission medium (e.g., air interface). A user interface 1212 (e.g., keypad, display, speaker, microphone, joystick) may also be provided.

The processor 1204 is responsible for managing the bus 1202 and general processing, including the execution of software stored on the computer-readable storage medium 1206. The software, when executed by the processor 1204, causes the processing system 1214 to perform the various functions described herein for any particular apparatus. The computer-readable storage medium 1206 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1206.

The computer-readable storage medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1206 may reside in the processing system 1214, external to the processing system 1214, or distributed across multiple entities including the processing system 1214. The computer-readable storage medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. The processor 1204 may include generating circuitry 1240 configured to generate a first signal for transmission to a base station on an uplink The generating circuitry 1240 may also be configured to generate a second signal for transmission to a relay entity on a sidelink utilizing one or more PRT resources. The generating circuitry 1240 may be configured to execute generating instructions 1250 stored in the computer-readable storage medium 1206 to implement any of the one or more of the functions described herein.

The processor 1204 may also include receiving circuitry 1242 configured to receive an indication of one or more peak-reduction tone (PRT) resources for a transmission of one or more signals for a base station. The receiving circuitry 1242 may also be configured to receive another indication of one or more peak-reduction tone (PRT) resources for a transmission of one or more signals for a base station. The receiving circuitry 1242 may further be configured to receive an availability message indicating that a relay entity is available to relay a second signal transmitted via the sidelink In addition, the receiving circuitry 1242 may be configured to receive an availability message indicating that a relay entity is available to relay a second signal transmitted via the sidelink The receiving circuitry 1242 may be configured to receive an indication that a relay entity is available to relay one or more signals received via a sidelink The receiving circuitry 1242 may be configured to execute receiving instructions 1252 stored in the computer-readable storage medium 1206 to implement any of the one or more of the functions described herein.

The processor 1204 may further include transmitting circuitry 1244 configured to transmit a first signal to the base station on an uplink The transmitting circuitry 1244 may be configured to transmit a second signal to a relay entity on a sidelink for reception by the base station. The transmitting circuitry 1244 may be configured to transmit the first signal to the base station on the uplink utilizing the one or more PRT resources. The transmitting circuitry 1244 may be configured to transmit a data communication signal to the relay entity on the sidelink for reception by the base station, where the data communication signal is transmitted on the sidelink utilizing the one or more PRT resources. The transmitting circuitry 1244 may be configured to transmit the data communication signal to the relay entity on the sidelink for reception by the base station, where the data communication signal is transmitted on the sidelink utilizing the one or more different PRT resources. The transmitting circuitry 1244 may be configured to transmit the second signal to a second relay entity on the sidelink for reception by the base station, where the second signal is transmitted on the sidelink to the second relay entity utilizing the one or more PRT resources. The transmitting circuitry 1244 may be configured to transmit a third signal to a third relay entity on the sidelink for reception by the base station, where the third signal is transmitted on the sidelink to the third relay entity utilizing the one or more PRT resources. The transmitting circuitry 1244 may be configured to execute transmitting instructions 1254 stored in the computer-readable storage medium 1206 to implement any of the one or more of the functions described herein.

In addition, the processor 1204 may further include allocating circuitry 1246 configured to allocate one or more peak-reduction tone (PRT) resources for a transmission of at least one signal of the one or more signals on the sidelink. The allocating circuitry 1246 may also be configured to allocate one or more different PRT resources for a transmission of a data communication signal for the base station. The allocating circuitry 1246 may be configured to execute allocating instructions 1256 stored in the computer-readable storage medium 1206 to implement any of the one or more of the functions described herein.

Figure 13:
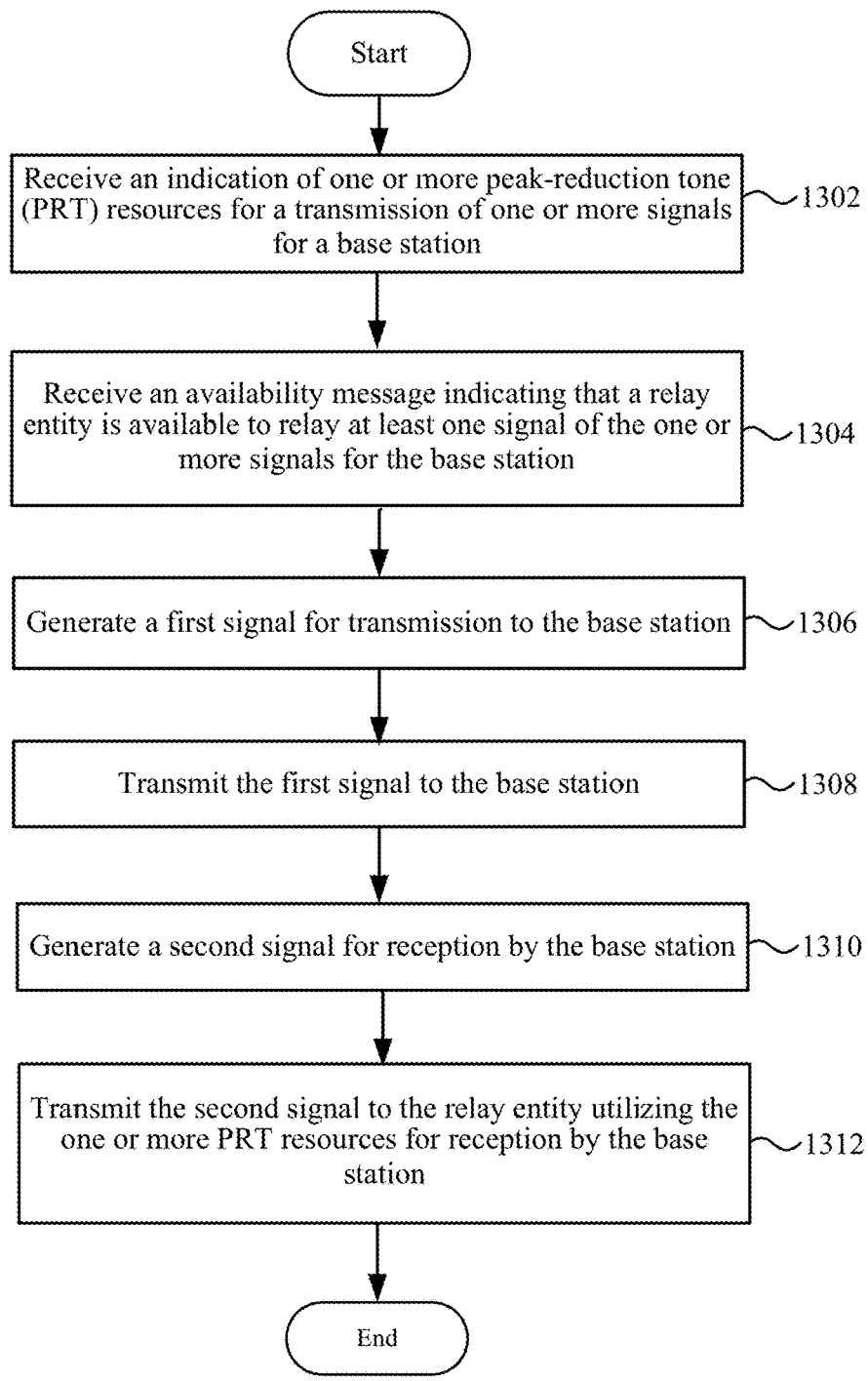
FIG. 13 is a flow chart of a method for tone reservation according to some aspects.

FIG. 13 is a flow chart of a method for tone reservation according to some aspects. As described below, some or all illustrated features may be omitted in a particular implementation within the scope of the present disclosure, and some illustrated features may not be required for implementation of all aspects. In some examples, the method may be performed by the UE 1200, as described above, and illustrated in FIG. 12, by a processor or processing system, or by any suitable means for carrying out the described functions.

At block 1302, the UE 1200 receives an indication of one or more peak-reduction tone (PRT) resources for a transmission of one or more signals for a base station. For example, the UE may receive the indication of the one or more PRT resources from the base station using a physical downlink control channel (PDCCH) (e.g., downlink control information (DCI) of a PDCCH). For example, the base station may have an established link with the UE such that the base station and the UE are transmitting data packets between each other. During such communication, the base station may transmit the one or more PRT resources to the UE using a PDCCH. In some aspects, the base station may transmit the indication of the one or more PRT resources using a medium access control (MAC) control element (MAC-CE), a radio access network (RAN) MAC-CE, a RAN radio resource control (RRC) message, or the like.

At block 1304, the UE 1200 receives an availability message indicating that a relay entity is available to relay at least one signal of the one or more signals for reception by the base station. For example, the relay availability message informs the UE that the relay entity is available to receive a signal from the UE and transmit the signal for reception by the base station. The UE may receive a relay availability message from the relay entity before, while, or after the UE receives the indication of the one or more PRT resources from the base station. As discussed herein with respect to FIG. 9, the relay availability message may be a solicitation message received from the relay entity. In response to the UE receiving the solicitation message from the relay entity, the UE may transmit a response (e.g., an acknowledgement response) in forming the relay entity that the UE is aware that the relay entity is available for signal relay. As described herein with respect to FIG. 10, the relay availability message may be an announcement message received from the relay entity. In response to the UE receiving the announcement message from the relay entity, the UE may simply transmit one or more signals to the relay entity without any additional acknowledgement.

At block 1306, the UE 1200 generates a first signal for transmission to the base station. For example, the first signal may be, for example, a discovery signal or a data signal. At block 1308, the UE 1200 transmits the first signal to the base station. For example, the UE may transmit the first signal to the base station on an uplink In some examples, the UE may transmit the first to the base station on the uplink utilizing the one or more PRT resources provided in the indication.

At block 1310, the UE 1200 generates a second signal for reception by the base station. For example, the first signal may be, for example, a discovery signal or a data signal (e.g., a data communication signal). In some aspects, the second signal may be the same signal as first signal. For example, the first signal may be a discovery signal and the second signal may be a same discovery signal as the first signal. As another example, the first signal may be a data signal and the second signal by another data signal (e.g., same type of signal, but a different signal). When the first signal and the second signal are the same signal (e.g., the same exact signal), the UE may transmit the first signal to the base station and the second signal to the relay entity for reception by the base station so that the intended message contained in the first signal and the second may have a greater chance of being received by the base station.

In some aspects, the second signal is a different signal than the first signal. For example, the first signal may be a first discovery signal and the second signal may be a second and different discovery signal compared to the first signal. As another example, the first signal may be a discovery signal and the second signal may be data signal. When the first signal and the second signal are different signals, the UE may transmit the first signal to the base station and the second signal to the relay entity for reception by the base station.

At block 1312, the UE 1200 transmits the second signal to the relay entity utilizing the one or more PRT resources for reception by the base station. For example, the UE may transmit the second signal to the relay entity using the one or more PRT resources on a sidelink In some aspects, upon receiving the second signal, the relay entity may relay or transmit the second signal to the base station on the uplink As another example, the UE may transmit the second signal to a plurality of relay entities using the one or more PRT resources on a sidelink In some aspects, upon receiving the second signal, each of the relay entities may relay or transmit the second signal to the base station on the uplink As yet another example, the UE may transmit the second signal to the relay entity using the one or more PRT resources on the sidelink so that the relay entity transmits the second signal to another relay entity on the sidelink In some aspects, upon receiving the second signal on the sidelink, the other relay entity may relay or transmit the second signal to the base station on the uplink In some aspects, upon receiving the second signal from the UE 604 using the one or more PRT resources, the relay entity may transmit the second signal to the base station. As another example, upon receiving the second signal from the UE using the one or more PRT resources, each of a plurality of relay entities may transmit the second signal to the base station. As yet another example, upon receiving the second signal from the UE using the one or more PRT resources, the relay entity may transmit the second signal to another relay entity which transmits the second signal to the base station.

In some aspects, after the UE transmits the second signal to the relay entity using the one or more PRT resources on the sidelink, the UE may receive another indication of one or more PRT resources for a transmission of one or more additional signals for the base station. In this example, the UE may generate and transmit one or more additional signals on an uplink to the base station and/or on a sidelink to one or more relay entities. The UE may transmit the one or more additional signals utilizing the one or more PRT resources indicated in the other indication. In some examples, each of the one or more additional signals may be a discovery signal or a data signal.

Figure 14:
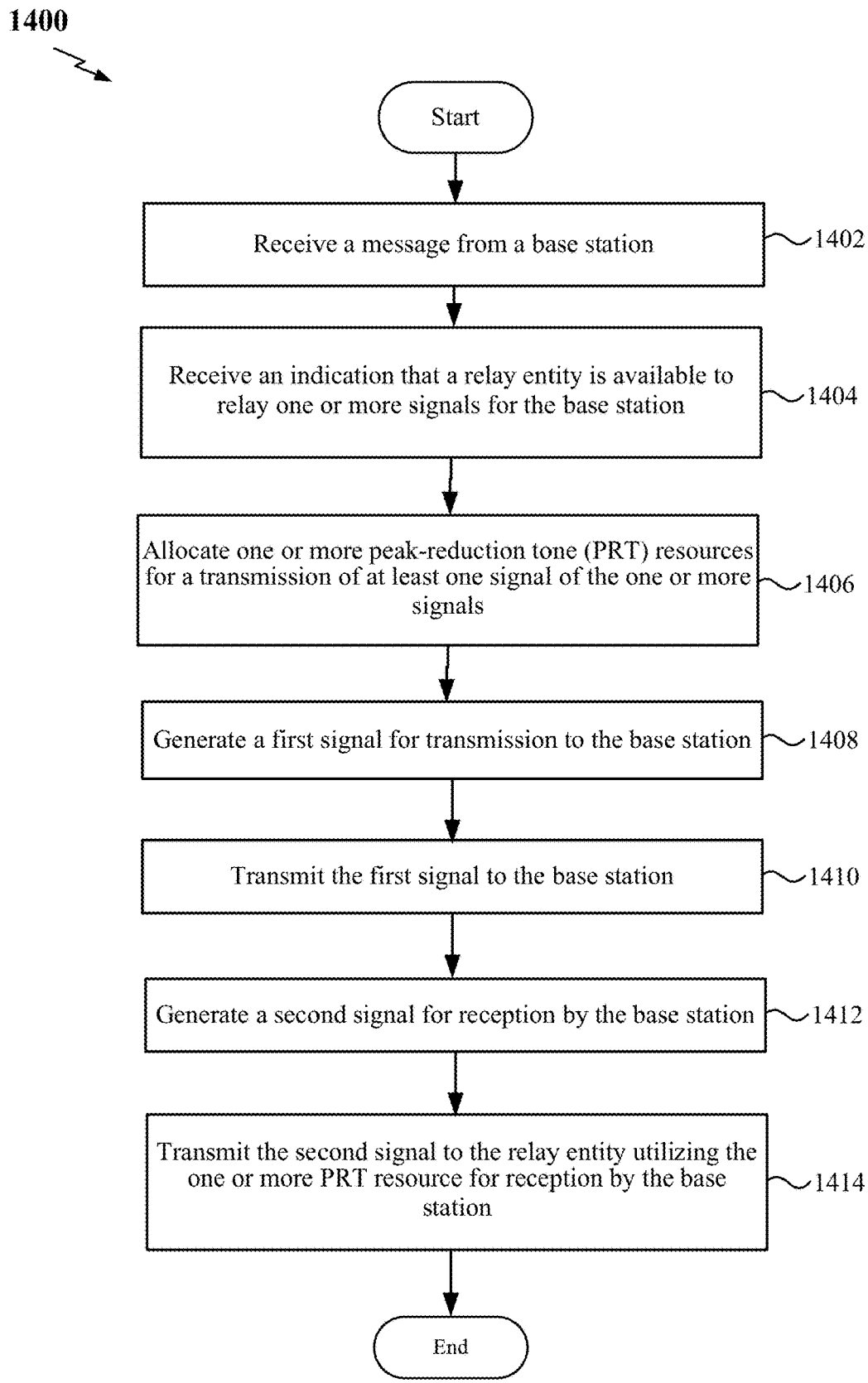
FIG. 14 is another flow chart of a method for tone reservation according to some aspects.

FIG. 14 is another flow chart of a method for tone reservation according to some aspects. As described below, some or all illustrated features may be omitted in a particular implementation within the scope of the present disclosure, and some illustrated features may not be required for implementation of all aspects. In some examples, the method may be performed by the UE 1200, as described above, and illustrated in FIG. 12, by a processor or processing system, or by any suitable means for carrying out the described functions.

At block 1402, the UE 1200 receives a message from a base station. For example, the message may be a discovery message or a data message (e.g., a data communication message). At block 1404, the UE 1200 receives an indication that a relay entity is available to relay one or more signal for reception by the base station. Block 1404 may be the same as or at least similar to block 1304 of FIG. 13.

At block 1406, the UE 1200 allocates one or more peak-reduction tone (PRT) resources for a transmission of at least one signal of the one or more signals. As described herein, the one or more PRT resources may be used for sidelink communication between the UE and the relay entity. Additionally, or alternatively, the one or more PRT resources may be used for sidelink communication between the relay entity and one or more other relay entities. Additionally, or alternatively, the one or more PRT resources may be used for uplink communication between the base station and the UE. Additionally, or alternatively, the one or more PRT resources may be used for uplink communication between the base station and one or more relay entities. In some examples, the one or more PRT resources may be used for sidelink communication between the base station and the UE when direct communication (uplink or downlink) is unavailable, intermittent, or below a threshold strength or quality.

In some aspects, as discussed herein with respect to FIGS. 7A and 7B, the one or more PRT resources may include one or more sub-channels. In some aspects, the one or more PRT resources may include an arbitrary set of one or more allocated resources. For example, the one or more allocated resources may include one or more integer multiples of one or more sub-channels. In some aspects, each of one or more PRT resources may include an optimized PRT value. In some aspects, each of the one or more PRT resources may be allocated according to a fixed pseudo-random pattern. For example, each of the one or more PRT resources may be allocated according to a fixed pseudo-random pattern that is determined based on Golomb rulers. In certain examples, the patterns may be known to both the base station and the UE. As discussed herein with respect to FIGS. 8A and 8B, each of the one or more PRT resources may utilize side-band PRT resource allocation or in-band PRT resource allocation.

At block 1408, the UE 1200 generates a first signal for transmission to the base station. Block 1408 may be the same as or at least similar to block 1306 of FIG. 13. At block 1410, the UE 1200 transmits the first signal to the base station. Block 1410 may be the same as or at least similar to block 1308 of FIG. 13. At block 1412, the UE 1200 generates a second signal for reception by the base station. Block 1412 may be the same as or at least similar to block 1310 of FIG. 13. At block 1414, the UE 1200 transmits the second signal to the relay entity utilizing the one or more PRT resources for reception by the base station. Block 1414 may be the same as or at least similar to block 1312 of FIG. 13.

Figure 15:
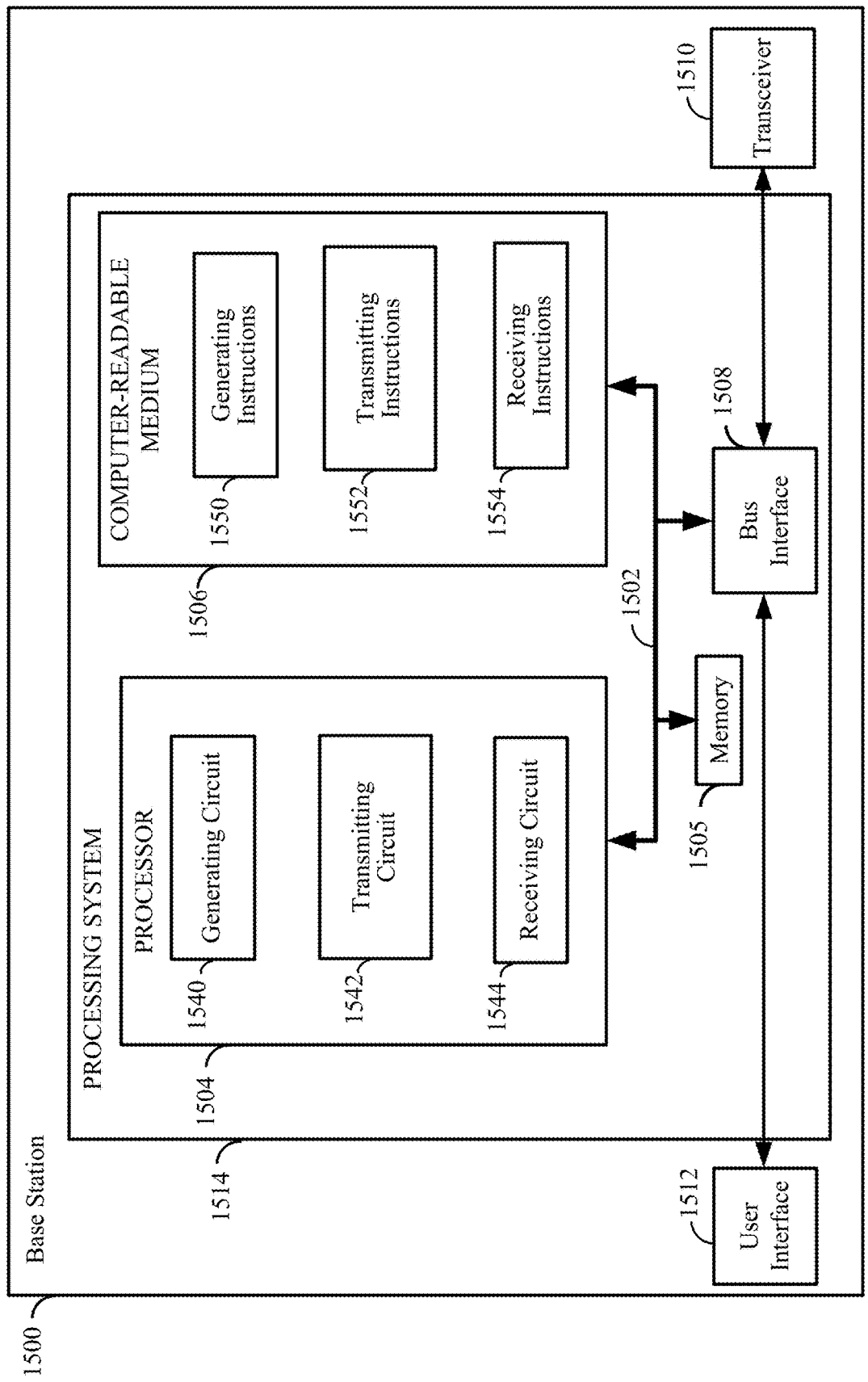
FIG. 15 is a block diagram illustrating an example of a hardware implementation for a base station employing a processing system according to some aspects.

FIG. 15 is a block diagram illustrating an example of a hardware implementation for a radio access network (RAN) node or base station 1500 employing a processing system 1514 according to some aspects. For example, the base station 1500 may correspond to any of the base stations (e.g., gNB or eNB) shown and described above in any one or more of FIGS. 1-4, 6, 9, 10, and 11.

In accordance with various aspects of the disclosure, an element, or any portion of an element, or any combination of elements may be implemented with a processing system 1514 that includes one or more processors 1504. The processing system 1514 may be substantially the same as the processing system 1214 illustrated in FIG. 12, including a bus interface 1508, a bus 1502, a processor 1504, and a computer-readable storage medium 1506. Furthermore, the base station 1500 may include a user interface 1512 and a transceiver 1510 substantially similar to those described above in FIG. 12. That is, the processor 1504, as utilized in a base station 1500, may be used to implement any one or more of the processes described herein.

In some aspects of the disclosure, the processor 1504 may include circuitry configured for various functions. For example, the processor 1504 may include generating circuitry 1540 configured to generate an indication of one or more peak-reduction tone (PRT) resources for a transmission of one or more signals by a scheduled entity. The generating circuitry 1540 may be configured to generate a message for transmission to a user equipment (UE). The generating circuitry 1540 may be configured to execute generating instructions 1550 stored in the computer-readable storage medium 1506 to implement any of the one or more of the functions described herein.

The processor 1504 may also include transmitting circuitry 1542 configured to transmit a CSI-RS to a UE. The transmitting circuitry 1542 may be configured to transmit an indication of one or more peak-reduction tone (PRT) resources for a transmission of one or more signals by a scheduled entity. The transmitting circuitry 1542 may be configured to transmit another indication of one or more different PRT resources for a transmission of a data communication signal by the scheduled entity. The transmitting circuitry 1542 may be configured to transmit a message to a user equipment (UE). The transmitting circuitry 1542 may be configured to execute transmitting instructions 1552 stored in the computer-readable storage medium 1506 to implement any of the one or more of the functions described herein.

The processor 1504 may further include receiving circuitry 1544 configured to receive a first signal from the scheduled entity and a second signal from a relay entity on an uplink, where the relay entity received the second signal from the scheduled entity on a sidelink utilizing the one or more PRT resources. The receiving circuitry 1544 may be configured to receive a data communication signal from the relay entity on the uplink after receiving at least one of the first signal or the second signal, wherein the relay entity received the data communication signal from the scheduled entity on the sidelink utilizing the one or more PRT resources. The receiving circuitry 1544 may be configured to receive the data communication signal from the relay entity on the uplink after receiving at least one of the first signal or the second signal, where the relay entity received the data communication signal from the scheduled entity on the sidelink utilizing the one or more different PRT resources. The receiving circuitry 1544 may be configured to receive the second signal from a second relay entity on the uplink, wherein the second relay entity received the second signal from the scheduled entity on the sidelink utilizing the one or more PRT resources. The receiving circuitry 1544 may be configured to receive a third signal from a third relay entity on the uplink, wherein the third relay entity received the second signal from the scheduled entity on the sidelink utilizing the one or more PRT resources. The receiving circuitry 1544 may be configured to receive a first signal from the UE and a second signal from a relay entity on an uplink, where the relay entity received the second signal from the UE on a sidelink utilizing the one or more PRT resources The receiving circuitry 1544 may further be configured to execute receiving instructions 1554 stored in the computer-readable storage medium 1506 to implement any of the one or more of the functions described herein.

Figure 16:
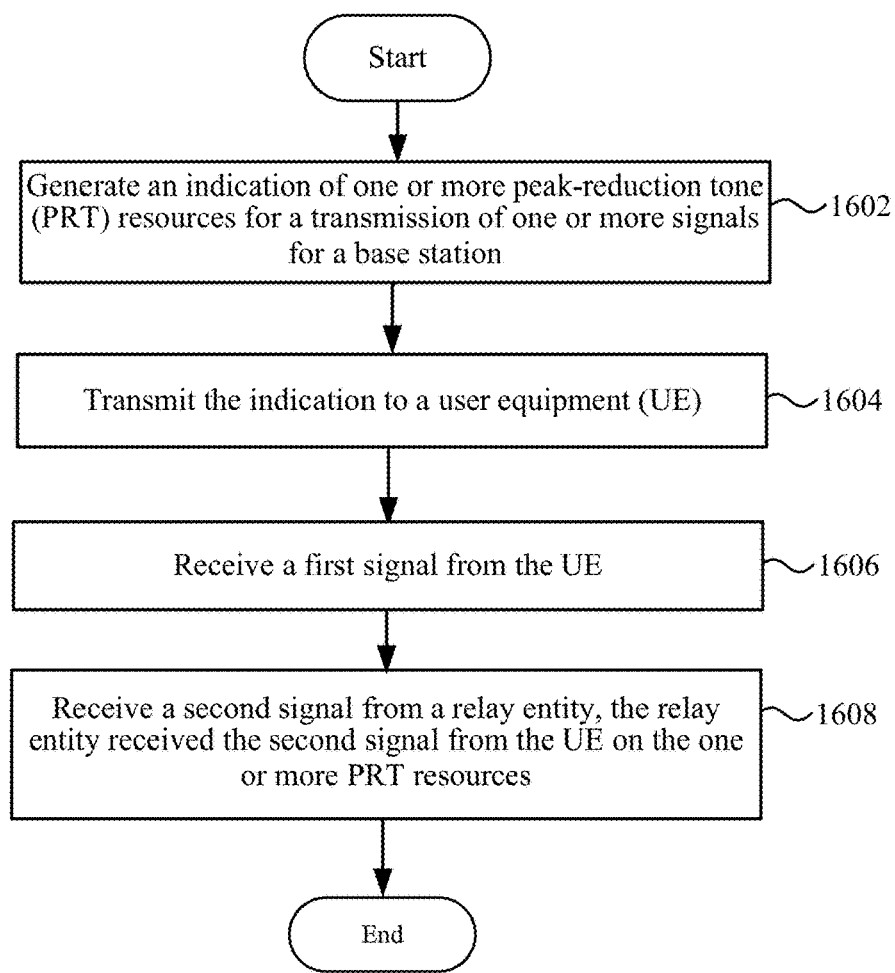
FIG. 16 is a flow chart of a method for tone reservation according to some aspects.

FIG. 16 is a flow chart of a method for tone reservation according to some aspects. As described below, some or all illustrated features may be omitted in a particular implementation within the scope of the present disclosure, and some illustrated features may not be required for implementation of all aspects. In some examples, the method may be performed by the base station 1500, as described above and illustrated in FIG. 15, by a processor or processing system, or by any suitable means for carrying out the described functions.

At block 1602, the base station 1500 generates an indication of one or more peak-reduction tone (PRT) resources for a transmission of one or more signals for reception by the base station. As described herein, the one or more PRT resources may be used for sidelink communication between the UE and the relay entity. Additionally, or alternatively, the one or more PRT resources may be used for sidelink communication between the relay entity and one or more other relay entities. Additionally, or alternatively, the one or more PRT resources may be used for uplink communication between the base station and the UE. Additionally, or alternatively, the one or more PRT resources may be used for uplink communication between the base station and one or more relay entities. In some examples, the one or more PRT resources may be used for sidelink communication between the base station and the UE when direct communication (uplink or downlink) is unavailable, intermittent, or below a threshold strength or quality.

In some aspects, as discussed further herein with respect to FIGS. 7A and 7B, the one or more PRT resources may include one or more sub-channels. In some aspects, the one or more PRT resources may include an arbitrary set of one or more allocated resources. For example, the one or more allocated resources may include one or more integer multiples of one or more sub-channels. In some aspects, each of one or more PRT resources may include an optimized PRT value. In some aspects, each of the one or more PRT resources may be allocated according to a fixed pseudo-random pattern. For example, each of the one or more PRT resources may be allocated according to a fixed pseudo-random pattern that is determined based on Golomb rulers. In certain examples, the patterns may be known to both the base station and the UE. As discussed further herein with respect to FIGS. 8A and 8B, each of the one or more PRT resources may utilize side-band PRT resource allocation or in-band PRT resource allocation.

At block 1604, the base station 1500 transmits the indication to a user equipment (UE). In some aspects, the base station may transmit the indication of the one or more PRT resources to the UE using a physical downlink control channel (PDCCH) (e.g., downlink control information (DCI) of a PDCCH). For example, the base station may have an established link with the UE such that the base station and the UE are transmitting data packets between each other. During such communication, the base station may transmit the one or more PRT resources to the UE using a PDCCH. In some aspects, the base station may transmit the indication of the one or more PRT resources using a medium access control (MAC) control element (MAC-CE), a radio access network (RAN) MAC-CE, a RAN radio resource control (RRC) message, or the like.

At block 1606, the base station 1500 receives a first signal from the UE. The first signal may be, for example, a discovery signal or a data signal. At block 1608, the base station 1500 receives a second signal from a relay entity, where the relay entity received the second signal from the UE on the one or more PRT resources. The first signal may be, for example, a discovery signal or a data signal (e.g., a data communication signal). In some aspects, the second signal may be the same signal as first signal. For example, the first signal may be a discovery signal and the second signal may be a same discovery signal as the first signal. As another example, the first signal may be a data signal and the second signal by another data signal (e.g., same type of signal, but a different signal). When the first signal and the second signal are the same signal (e.g., the same exact signal), the UE may transmit the first signal to the base station and the second signal to the relay entity for reception by the base station so that the intended message contained in the first signal and the second may have a greater chance of being received by the base station.

In some aspects, the second signal is a different signal than the first signal. For example, the first signal may be a first discovery signal and the second signal may be a second and different discovery signal compared to the first signal. As another example, the first signal may be a discovery signal and the second signal may be data signal. When the first signal and the second signal are different signals, the UE may transmit the first signal to the base station and the second signal to the relay entity for reception by the base station.

In some aspects, in order for the base station to receive the second signal, the UE may transmit the second signal to the relay entity using the one or more PRT resources on a sidelink In some aspects, upon receiving the second signal, the relay entity may relay or transmit the second signal to the base station on the uplink As another example, the UE may transmit the second signal to a plurality of relay entities using the one or more PRT resources on a sidelink In some aspects, upon receiving the second signal, each of the relay entities may relay or transmit the second signal to the base station on the uplink As yet another example, the UE may transmit the second signal to the relay entity using the one or more PRT resources on the sidelink so that the relay entity transmits the second signal to another relay entity on the sidelink In some aspects, upon receiving the second signal on the sidelink, the other relay entity may relay or transmit the second signal to the base station on the uplink.

Subsequently, the relay entity may transmit the second signal to the base station. For example, upon receiving the second signal from the UE using the one or more PRT resources, the relay entity may transmit the second signal to the base station. As another example, upon receiving the second signal from the UE using the one or more PRT resources, each of a plurality of relay entities may transmit the second signal to the base station. As yet another example, upon receiving the second signal from the UE using the one or more PRT resources, the relay entity may transmit the second signal to another relay entity which transmits the second signal to the base station.

In some aspects, after the base station receives the second signal from the relay entity, the base station may transmit another indication of one or more PRT resources for a reception of one or more additional signals from the UE. In this example, the UE may generate and transmit one or more additional signals on an uplink to the base station and/or on a sidelink to one or more relay entities. The base station may receive the one or more additional signals utilizing the one or more PRT resources indicated in the other indication. In some examples, each of the one or more additional signals may be a discovery signal or a data signal.

Figure 17:
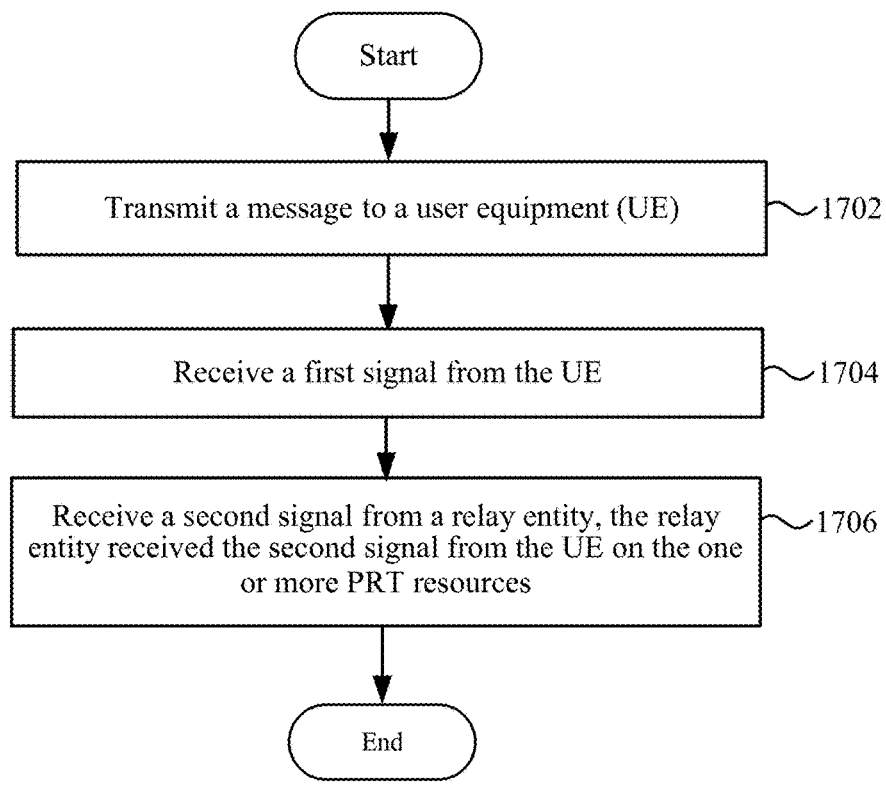
FIG. 17 is another flow chart of a method for tone reservation according to some aspects.

FIG. 17 is a flow chart of another method for tone reservation according to some aspects. As described below, some or all illustrated features may be omitted in a particular implementation within the scope of the present disclosure, and some illustrated features may not be required for implementation of all aspects. In some examples, the method may be performed by the base station 1500, as described above and illustrated in FIG. 15, by a processor or processing system, or by any suitable means for carrying out the described functions.

At block 1702, the base station 1500 transmits a message to a user equipment (UE). For example, the message may be a discovery message or a data message (e.g., a data communication message). At block 1704, the base station 1500 receives a first signal form the UE. Block 1704 may be the same as or at least similar to block 1606 of FIG. 16. At block 1706, the base station 1500 receives a second signal from a relay entity, where the relay entity received the second signal from the UE on the one or more PRT resources. Block 1706 may be the same as or at least similar to block 1608 of FIG. 16.

Figure 18:
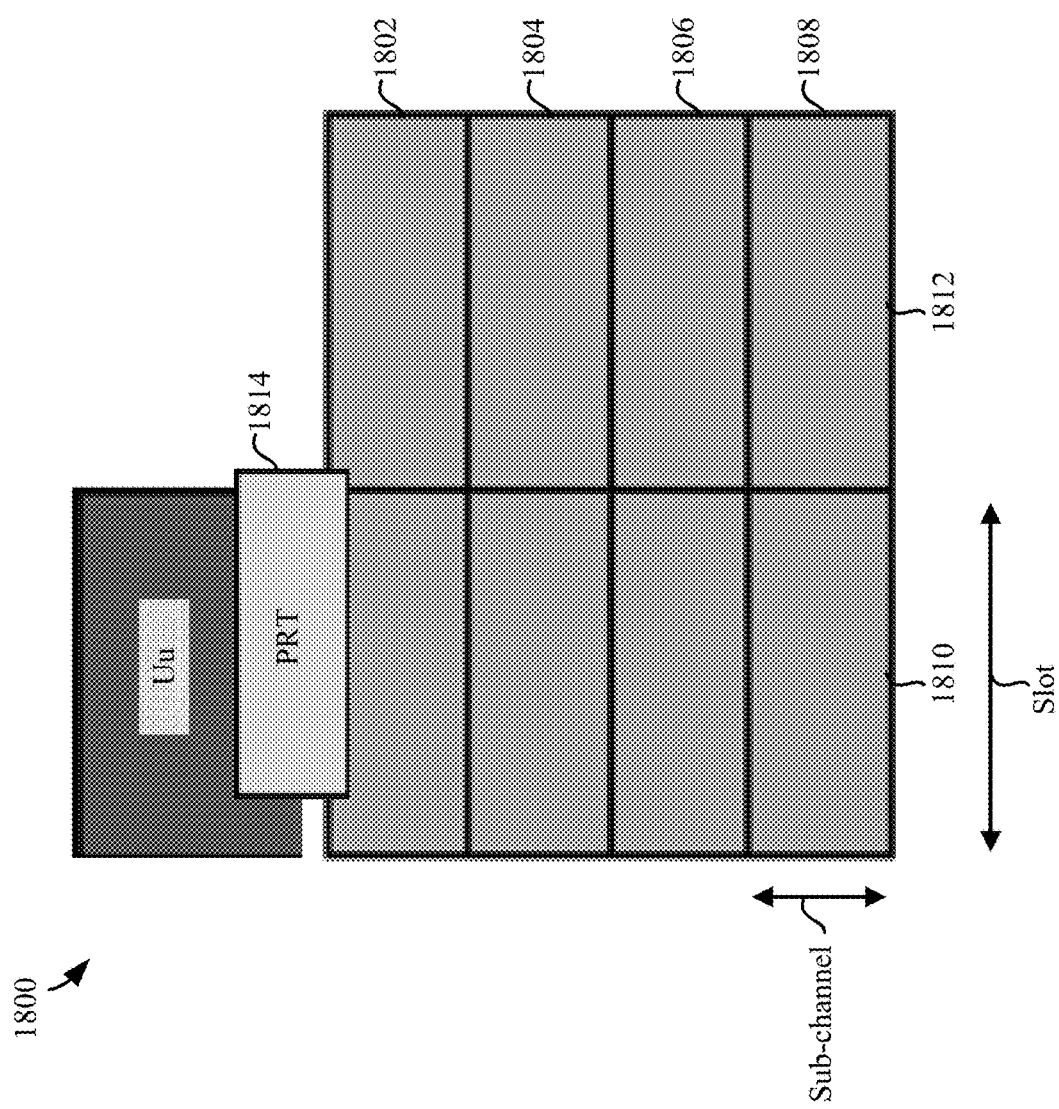
FIG. 18 is a diagram illustrating an example of a frame structure for tone reservation according to some aspects.

FIG. 18 is a diagram illustrating an example of a frame structure 1800 for tone reservation according to some aspects. As shown in FIG. 18, the frame structure 1800 may be for uplink communication and include a plurality of sub-channels including a first sub-channel 1802, a second sub-channel 1804, a third sub-channel 1806, and a fourth sub-channel 1808. The frame structure 1800 may also include a plurality of slots including a first slot 1810 and a second slot 1812. A PRT resource 1814 may be offset from the first slot 1810 and the second slot 1812.

Sidelink communications may take place in transmission or reception resource pools. A minimum resource allocation unit may be a sub-channel in frequency. In some aspects, a resource allocation in time may include one slot. In some aspects, one or more slots may not be available for sidelink communication. In some aspects, one or more slots may contain feedback resources. Resource allocation in the sidelink may be configured using RRC signal. For example, the resource allocation may be pre-loaded on a UE. As another example, the resource allocation may be provided to the UE from a base station.

Figure 19A:
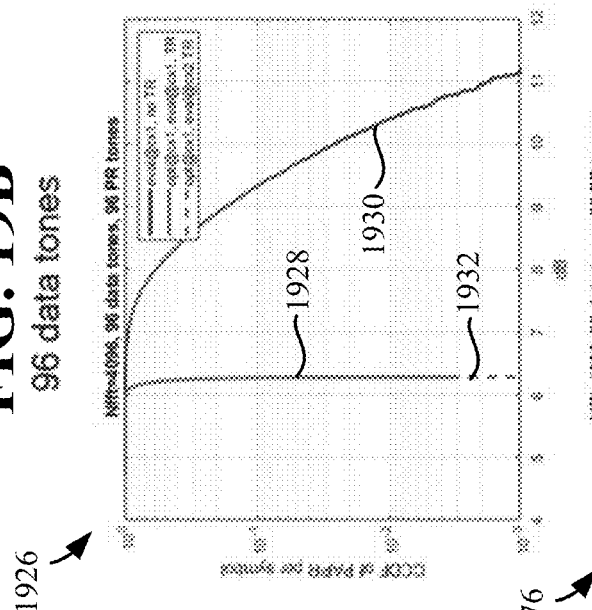
FIGS. 19A, 19B, 19C, and 19D are graphs illustrating example performance information for tone reservation according to some aspects.
Figure 19B:
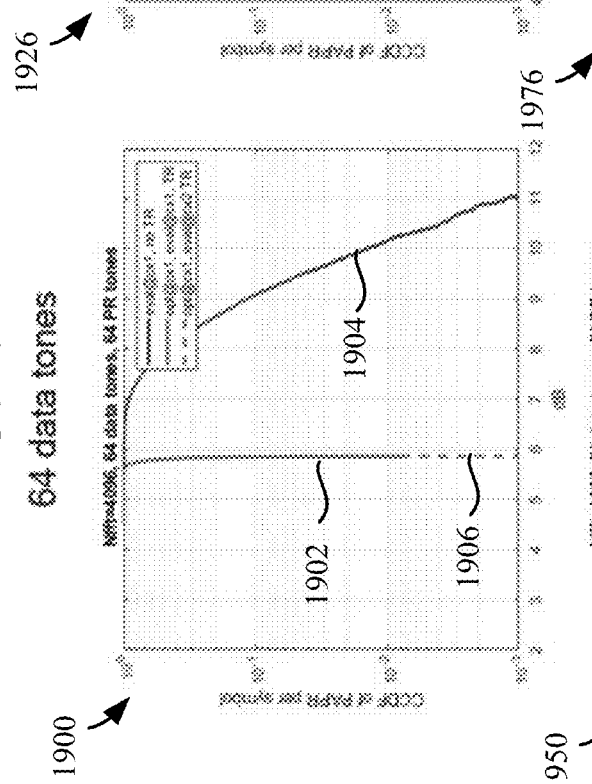

FIGS. 19A, 19B, 19C, and 19D are graphs illustrating example performance information for tone reservation according to some aspects. Graph 1900 of FIG. 19A illustrates, with respect to sixty-four data tones and peak to average power ration (PAPR) per symbol, a complementary cumulative distribution function (CCDF) curve of PAPR per symbol versus decibels. Line 1902 illustrates an opt@cx1, eval@cx1, with tone reduction. Line 1904 illustrates an eval@cx1, with no tone reduction. Line 1906 illustrates an opt@cx1, eval@cx2 with tone reduction. Graph 1926 of FIG. 19B illustrates, with respect to ninety-six data tones and peak to average power ration (PAPR) per symbol, a complementary cumulative distribution function (CCDF) curve of PAPR per symbol versus decibels. Line 1928 illustrates an opt@cx1, eval@cx1, with tone reduction. Line 1930 illustrates an eval@cx1, with no tone reduction. Line 1932 illustrates an opt@cx1, eval@cx2 with tone reduction.

Figure 19C:
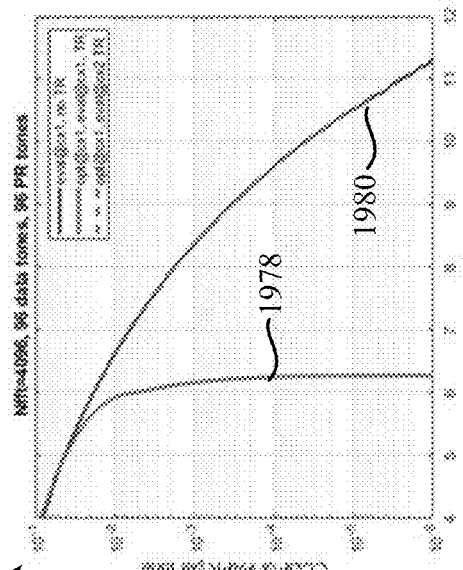
Figure 19D:
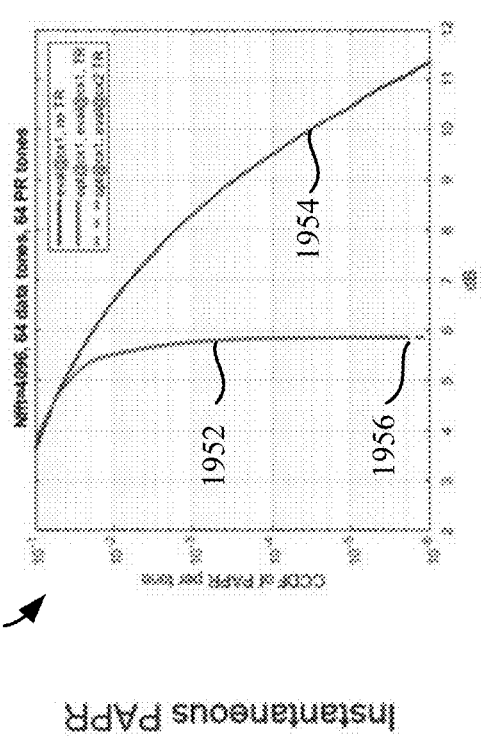

Graph 1950 of FIG. 19C illustrates, with respect to sixty-four data tones and instantaneous PAPR, a complementary cumulative distribution function (CCDF) curve of PAPR per symbol versus decibels. Line 1952 illustrates an opt@cx1, eval@cx1, with tone reduction. Line 1954 illustrates an eval@cx1, with no tone reduction. Line 1956 illustrates an opt@cx1, eval@cx2 with tone reduction. Graph 1976 of FIG. 19D illustrates, with respect to ninety-six data tones and instantaneous PAPR, a complementary cumulative distribution function (CCDF) curve of PAPR per symbol versus decibels. Line 1978 illustrates an opt@cx1, eval@cx1, with tone reduction. Line 1980 illustrates an eval@cx1, with no tone reduction. An opt@cx1, eval@cx2 with tone reduction may not be indicated in graph 1976.

The following provides an overview of several aspects of the present disclosure.

Aspect 1: A method for wireless communication by a scheduled entity, comprising: receiving an indication of one or more peak-reduction tone (PRT) resources for reception of one or more signals by a base station; transmitting a first signal to the base station on an uplink; and transmitting a second signal to a relay entity on a sidelink for reception by the base station, wherein the second signal is transmitted on the sidelink utilizing the one or more PRT resources.

Aspect 2: The method of aspect 1, wherein the transmitting the first signal to the base station on the uplink comprises: transmitting the first signal to the base station on the uplink utilizing the one or more PRT resources.

Aspect 3: The method of aspect 1 or 2, wherein at least one of the first signal or the second signal comprise a discovery signal or a data communication signal.

Aspect 4: The method of any of aspects 1 through 3, wherein at least one of the first signal or the second signal comprise a discovery signal, and the method further comprises: transmitting a data communication signal to the relay entity on the sidelink for reception by the base station, wherein the data communication signal is transmitted on the sidelink utilizing the one or more PRT resources.

Aspect 5: The method of any of aspects 1 through 4, wherein at least one of the first signal or the second signal comprises a discovery signal, and the method further comprises: receiving another indication of one or more different PRT resources for a transmission of a data communication signal for the base station; and transmitting the data communication signal to the relay entity on the sidelink for reception by the base station, wherein the data communication signal is transmitted on the sidelink utilizing the one or more different PRT resources.

Aspect 6: The method of any of aspects 1 through 5, wherein the one or more PRT resources comprises one or more sub-channels.

Aspect 7: The method of any of aspects 1 through 5, wherein the one or more PRT resources comprises an arbitrary subset of one or more allocated resources.

Aspect 8: The method of any of aspects 1 through 7, wherein the one or more allocated resources comprise one or more integer multiples of one or more sub-channels.

Aspect 9: The method of any of aspects 1 through 8, wherein the scheduled entity comprises a first user equipment (UE) and the relay entity comprises a second UE.

Aspect 10: The method of any of aspects 1 through 9, wherein the indication is received in one of a radio resource control (RRC), a medium access control control element (MAC-CE), or downlink control indication (DCI).

Aspect 11: The method of any of aspects 1 through 5, 9, or 10, wherein each of the one or more PRT resources comprise an optimized PRT value.

Aspect 12: The method of any of aspects 1 through 5, 9, or 10, wherein the one or more PRT resources are allocated according to a fixed pseudo-random pattern.

Aspect 13: The method of aspect 12, wherein the fixed pseudo-random pattern is determined according to a Golomb ruler.

Aspect 14: The method of any of aspects 1 through 13, further comprising: receiving an availability message indicating that the relay entity is available to relay the second signal transmitted via the sidelink.

Aspect 15: The method of any of aspects 1 through 14, wherein the relay entity is a first relay entity; and further comprising at least one of: transmitting the second signal to a second relay entity on the sidelink for reception by the base station, wherein the second signal is transmitted on the sidelink to the second relay entity utilizing the one or more PRT resources, or transmitting a third signal to a third relay entity on the sidelink for reception by the base station, wherein the third signal is transmitted on the sidelink to the third relay entity utilizing the one or more PRT resources.

Aspect 16: A user equipment (UE), comprising: a transceiver for wirelessly communicating with a base station; a memory; and a processor coupled to the transceiver and the memory, wherein the processor and the memory are configured to: receive an indication of one or more peak-reduction tone (PRT) resources for reception of one or more signals by the base station, transmit a first signal to the base station on an uplink, and transmit a second signal to a relay entity on a sidelink for reception by the base station, wherein the second signal is transmitted on the sidelink utilizing the one or more PRT resources.

Aspect 17: A method for wireless communication by a scheduling entity, comprising: transmitting an indication of one or more peak-reduction tone (PRT) resources for transmission of one or more signals by a scheduled entity; and receiving a first signal from the scheduled entity and a second signal from a relay entity on an uplink, wherein the relay entity received the second signal from the scheduled entity on a sidelink utilizing the one or more PRT resources.

Aspect 18: The method of aspect 17, wherein the receiving the first signal from the scheduled entity on the uplink comprises: receiving the first signal from the scheduled entity on the uplink utilizing the one or more PRT resources.

Aspect 19: The method of any of aspects 17 through 18, wherein at least one of the first signal or the second signal comprise a discovery signal or a data communication signal.

Aspect 20: The method of any of aspects 17 through 18, wherein: at least one of the first signal or the second signal comprise a discovery signal; and the method further comprises: receiving a data communication signal from the relay entity on the uplink after receiving at least one of the first signal or the second signal, wherein the relay entity received the data communication signal from the scheduled entity on the sidelink utilizing the one or more PRT resources.

Aspect 21: The method of any of aspects 17 through 18, wherein at least one of the first signal or the second signal comprises a discovery signal; and the method further comprises: transmitting another indication of one or more different PRT resources for a transmission of a data communication signal by the scheduled entity, and receiving the data communication signal from the relay entity on the uplink after receiving at least one of the first signal or the second signal, wherein the relay entity received the data communication signal from the scheduled entity on the sidelink utilizing the one or more different PRT resources.

Aspect 22: The method of any of aspects 17 through 21, wherein the one or more PRT resources comprises one or more sub-channels.

Aspect 23: The method of any of aspects 17 through 21, wherein the one or more PRT resources comprises an arbitrary subset of one or more allocated resources.

Aspect 24: The method of aspect 23, wherein the one or more allocated resources comprise one or more integer multiples of one or more sub-channels.

Aspect 25: The method of any of aspects 17 through 24, wherein the scheduling entity comprises a base station, the scheduled entity comprises a first user equipment (UE), and the relay entity comprises a second UE.

Aspect 26: The method of any of aspects 17 through 25, wherein the indication is transmitted in one of a radio resource control (RRC), a medium access control (MAC) control element (MAC-CE), or downlink control indication (DCI).

Aspect 27: The method of any of aspects 17 through 26, wherein the one or more PRT resources are allocated according to a fixed pseudo-random pattern.

Aspect 28: The method of any of aspects 17 through 27, wherein the relay entity is a first relay entity, and further comprising at least one of: receiving the second signal from a second relay entity on the uplink, wherein the second relay entity received the second signal from the scheduled entity on the sidelink utilizing the one or more PRT resources, or receiving a third signal from a third relay entity on the uplink, wherein the third relay entity received the second signal from the scheduled entity on the sidelink utilizing the one or more PRT resources.

Aspect 29: The method of any of aspects 17 through 27, wherein: the relay entity is a first relay entity; and the first relay entity received the second signal via a second relay entity that received the second signal from the scheduled entity on the sidelink utilizing the one or more PRT resources.

Aspect 30: A base station, comprising: a transceiver for wirelessly communicating with a user equipment (UE); a memory; and a processor coupled to the transceiver and the memory, wherein the processor and the memory are configured to: transmit an indication of one or more peak-reduction tone (PRT) resources for a transmission of one or more signals by a scheduled entity, and receive a first signal from the scheduled entity and a second signal from a relay entity on an uplink, wherein the relay entity received the second signal from the scheduled entity on a sidelink utilizing the one or more PRT resources.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19D may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-19D may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a scheduled entity, comprising:
   receiving an indication of one or more peak-reduction tone (PRT) resources for reception of one or more signals by a base station;
   transmitting a first signal to the base station on a first uplink;
   generating a second signal for transmission from a relay entity to the base station on a second uplink; and
   transmitting the second signal to the relay entity on a sidelink, wherein the second signal is transmitted on the sidelink to the relay entity utilizing the one or more PRT resources.

2. The method of claim 1, wherein the transmitting the first signal to the base station on the first uplink comprises:
   transmitting the first signal to the base station on the first uplink utilizing the one or more PRT resources.

3. The method of claim 1, wherein at least one of the first signal or the second signal comprise a discovery signal or a data communication signal.

4. The method of claim 1, wherein at least one of the first signal or the second signal comprise a discovery signal, and the method further comprises:
   transmitting a data communication signal to the relay entity on the sidelink, wherein the data communication signal is transmitted on the sidelink to the relay entity utilizing the one or more PRT resources.

5. The method of claim 1, wherein at least one of the first signal or the second signal comprises a discovery signal, and the method further comprises:
   receiving another indication of one or more different PRT resources for a transmission of a data communication signal to the base station; and
   transmitting the data communication signal to the relay entity on the sidelink, wherein the data communication signal is transmitted on the sidelink to the relay entity utilizing the one or more different PRT resources.

6. The method of claim 1, wherein the one or more PRT resources comprises one or more sub-channels.

7. The method of claim 1, wherein the one or more PRT resources comprises an arbitrary subset of one or more allocated resources.

8. The method of claim 7, wherein the one or more allocated resources comprise one or more integer multiples of one or more sub-channels.

9. The method of claim 1, wherein the scheduled entity comprises a first user equipment (UE) and the relay entity comprises a second UE.

10. The method of claim 1, wherein the indication is received in one of a radio resource control (RRC), a medium access control element (MAC-CE), or a downlink control indication (DCI).

11. The method of claim 1, wherein each of the one or more PRT resources comprise an optimized PRT value.

12. The method of claim 1, wherein the one or more PRT resources are allocated according to a fixed pseudo-random pattern.

13. The method of claim 12, wherein the fixed pseudo-random pattern is determined according to a Golomb ruler.

14. The method of claim 1, further comprising:
receiving an availability message indicating that the relay entity is available to relay the second signal.

15. The method of claim 1, wherein the relay entity is a first relay entity, and the method further comprises at least one of:
transmitting the second signal to a second relay entity on a second sidelink, wherein the second signal is transmitted on the second sidelink to the second relay entity utilizing the one or more PRT resources, or
transmitting a third signal to a third relay entity on a third sidelink, wherein the third signal is transmitted on the third sidelink to the third relay entity utilizing the one or more PRT resources.

16. A user equipment (UE), comprising:
a transceiver for wirelessly communicating with a base station;
a memory; and
a processor coupled to the transceiver and the memory, wherein the processor and the memory are configured to:
receive an indication of one or more peak-reduction tone (PRT) resources for reception of one or more signals by the base station,
transmit a first signal to the base station on a first uplink,
generate a second signal for transmission from a relay entity to the base station on a second uplink, and
transmit the second signal to the relay entity on a sidelink, wherein the second signal is transmitted on the sidelink to the relay entity utilizing the one or more PRT resources.

17. A method for wireless communication by a scheduling entity, comprising:
transmitting, to a scheduled entity, an indication of one or more peak-reduction tone (PRT) resources for transmission of one or more signals by the scheduled entity;
receiving a first signal from the scheduled entity on a first uplink; and
receiving a second signal, generated by the scheduled entity for transmission to a relay entity on a first sidelink utilizing the one or more PRT resources, from the relay entity on a second uplink.

18. The method of claim 17, wherein the receiving the first signal from the scheduled entity on the first uplink comprises:
receiving the first signal from the scheduled entity on the first uplink utilizing the one or more PRT resources.

19. The method of claim 17, wherein at least one of the first signal or the second signal comprise a discovery signal or a data communication signal.

20. The method of claim 17, wherein at least one of the first signal or the second signal comprise a discovery signal, and the method further comprises:
receiving a data communication signal from the relay entity on a third uplink after receiving at least one of the first signal or the second signal, wherein the relay entity received the data communication signal from the scheduled entity on a second sidelink utilizing the one or more PRT resources.

21. The method of claim 17, wherein at least one of the first signal or the second signal comprises a discovery signal, and the method further comprises:
transmitting another indication of one or more different PRT resources for a transmission of a data communication signal by the scheduled entity, and
receiving the data communication signal from the relay entity on a third uplink after receiving at least one of the first signal or the second signal, wherein the relay entity received the data communication signal from the scheduled entity on a second sidelink utilizing the one or more different PRT resources.

22. The method of claim 17, wherein the one or more PRT resources comprises one or more sub-channels.

23. The method of claim 17, wherein the one or more PRT resources comprises an arbitrary subset of one or more allocated resources.

24. The method of claim 23, wherein the one or more allocated resources comprise one or more integer multiples of one or more sub-channels.

25. The method of claim 17, wherein the scheduling entity comprises a base station, the scheduled entity comprises a first user equipment (UE), and the relay entity comprises a second UE.

26. The method of claim 17, wherein the indication is transmitted in one of a radio resource control (RRC), a medium access control element (MAC-CE), or a downlink control indication (DCI).

27. The method of claim 17, wherein the one or more PRT resources are allocated according to a fixed pseudo-random pattern.

28. The method of claim 17, wherein the relay entity is a first relay entity, and the method further comprises at least one of:
receiving the second signal from a second relay entity on the second uplink, wherein the second relay entity received the second signal from the scheduled entity on the first sidelink utilizing the one or more PRT resources, or
receiving a third signal from a third relay entity on a third uplink, wherein the third relay entity received the third signal from the scheduled entity on a second sidelink utilizing the one or more PRT resources.

29. The method of claim 17, wherein the relay entity is a first relay entity, and the first relay entity received the second signal via a second relay entity that received the second signal from the scheduled entity on a second sidelink utilizing the one or more PRT resources.

30. A base station, comprising:
a transceiver for wirelessly communicating with a user equipment (UE);
a memory; and
a processor coupled to the transceiver and the memory, wherein the processor and the memory are configured to:
transmit, to the UE, an indication of one or more peak-reduction tone (PRT) resources for transmission of one or more signals by the UE,
receive a first signal from the UE on a first uplink, and
receive a second signal, generated by the UE for transmission to a relay entity on a sidelink utilizing the one or more PRT resources, from the relay entity on a second uplink.

* * * * *